(12) United States Patent
Morgan et al.

(10) Patent No.: US 11,212,244 B1
(45) Date of Patent: Dec. 28, 2021

(54) RENDERING MESSAGES HAVING AN IN-MESSAGE APPLICATION

(71) Applicant: Twitter, Inc., San Francisco, CA (US)

(72) Inventors: William Morgan, San Francisco, CA (US); Jeremy Gordon, San Francisco, CA (US); Grant Monroe, San Francisco, CA (US); Buster Benson, San Francisco, CA (US); Russell D'Sa, San Francisco, CA (US); Adam Singer, San Francisco, CA (US); Ian Chan, San Francisco, CA (US); Brian Ellin, San Francisco, CA (US); Reeve Thompson, San Francisco, CA (US); Lucas Alonso-Martinez, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/573,871

(22) Filed: Sep. 17, 2019

Related U.S. Application Data

(60) Division of application No. 15/804,979, filed on Nov. 6, 2017, now Pat. No. 10,454,859, which is a continuation of application No. 13/744,977, filed on Jan. 18, 2013, now Pat. No. 9,813,260.

(51) Int. Cl.
*G06F 15/16* (2006.01)
*H04L 12/58* (2006.01)

(52) U.S. Cl.
CPC .............. *H04L 51/06* (2013.01); *H04L 51/18* (2013.01); *H04L 51/36* (2013.01); *H04L 51/063* (2013.01); *H04L 51/066* (2013.01); *H04L 51/32* (2013.01)

(58) Field of Classification Search
CPC ......... H04L 51/06; H04L 51/36; H04L 51/18; H04L 51/32; H04L 51/066; H04L 51/063; G06F 40/186; G06F 40/106
USPC .......... 709/204, 206, 207, 217, 219; 705/319
See application file for complete search history.

(56) References Cited

U.S. PATENT DOCUMENTS

| | | | |
|---|---|---|---|
| 7,865,394 B1 | 1/2011 | Calloway et al. | |
| 9,887,941 B1 | 2/2018 | Guarraci | |
| 2002/0013708 A1* | 1/2002 | Walker | H04M 1/72448 704/260 |
| 2002/0073058 A1 | 6/2002 | Kremer | |
| 2004/0019648 A1 | 1/2004 | Huynh et al. | |

(Continued)

OTHER PUBLICATIONS

U.S. Appl. No. 13/744,977, filed Jan. 18, 2013, Morgan et al.
U.S. Appl. No. 14/612,998, filed Feb. 3, 2015, Guarraci et al.

*Primary Examiner* — Johnny B Aguiar
(74) *Attorney, Agent, or Firm* — Fish & Richardson P.C.

(57) ABSTRACT

A method for using an in-message application. The method includes: receiving a broadcast message; identifying, in the broadcast message, a reference to an external data provider; obtaining an identifier of the in-message application from the external data provider; using the identifier to identify a set of components of the in-message application, where placement of the set of components is defined by a visual structure of the in-message application, and where each of the set of components is a user interface (UI) element; associating data obtained from the external data provider with a component of the set of components; and serving the broadcast message and the data to a consumer client, where the consumer client renders the in-message application based on the visual structure.

18 Claims, 22 Drawing Sheets

(56) References Cited

U.S. PATENT DOCUMENTS

| | | |
|---|---|---|
| 2004/0075669 A1 | 4/2004 | Bronstein |
| 2004/0205514 A1 | 10/2004 | Sommerer |
| 2005/0240596 A1 | 10/2005 | Worthen et al. |
| 2006/0075033 A1 | 4/2006 | Bienstock et al. |
| 2006/0088144 A1* | 4/2006 | Mitchell ............ H04M 1/72547 379/88.17 |
| 2006/0168064 A1 | 7/2006 | Huynh et al. |
| 2007/0244977 A1* | 10/2007 | Atkins ................. H04L 51/063 709/206 |
| 2007/0271336 A1 | 11/2007 | Ramaswamy |
| 2008/0034040 A1 | 2/2008 | Wherry et al. |
| 2009/0079750 A1* | 3/2009 | Waxman .............. G06Q 10/107 345/581 |
| 2009/0113282 A1 | 4/2009 | Schultz |
| 2009/0144392 A1 | 6/2009 | Wang et al. |
| 2011/0004517 A1 | 1/2011 | Soto et al. |
| 2011/0145698 A1* | 6/2011 | Penov .................. G06F 40/221 715/235 |
| 2011/0153388 A1 | 6/2011 | Vuong |
| 2011/0176788 A1 | 7/2011 | Bliss et al. |
| 2011/0264751 A1 | 10/2011 | Jans |
| 2011/0265011 A1 | 10/2011 | Taylor |
| 2012/0072835 A1* | 3/2012 | Gross ..................... G06Q 10/10 715/243 |
| 2012/0109754 A1 | 5/2012 | Mei et al. |
| 2012/0109836 A1 | 5/2012 | Chen |
| 2012/0117176 A1* | 5/2012 | Luo ........................ H04L 51/18 709/206 |
| 2012/0254321 A1 | 10/2012 | Lindsay et al. |
| 2012/0317218 A1 | 12/2012 | Anderson et al. |
| 2013/0117656 A1 | 5/2013 | Verlaan |
| 2013/0151936 A1 | 6/2013 | Hsu |
| 2013/0227012 A1* | 8/2013 | Ramdas ................ H04L 51/063 709/204 |
| 2013/0268829 A1 | 10/2013 | Lansford |
| 2013/0311902 A1* | 11/2013 | O'Shaugnessy ...... G06F 40/169 715/753 |
| 2014/0025724 A1 | 1/2014 | Granger et al. |
| 2014/0052794 A1 | 2/2014 | Tucker et al. |
| 2014/0074629 A1 | 3/2014 | Rathod |
| 2014/0082494 A1 | 3/2014 | Harari |
| 2014/0115432 A1 | 4/2014 | Turner |

\* cited by examiner

A: Image
B: Text (User Name)

A: Text

A: Image

A: Video Player

A: Image
B: Image

A: Text (Bold Title, up to 2 lines)
B: Text (Description, clipped with ellipses)
C: Text (Byline)

Parade of Starts and fans for Houston's Funeral
The guest list and the parade of limousines with celebrities emerging from them seemed more suited to a Red carpet event in Hollywood or...
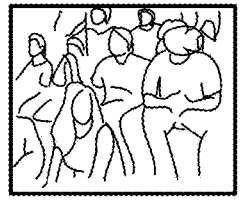
 Sarah Maslin Nir@SarahMa..
Example 512
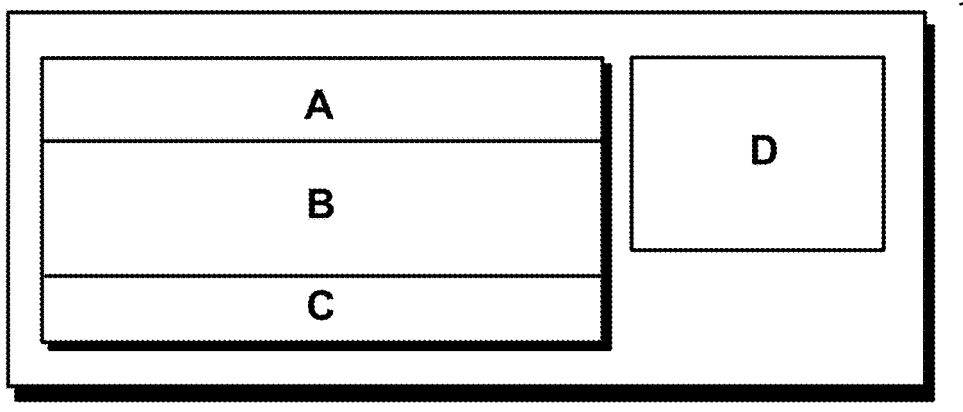
Structure 513
A: Text (Bold Title, up to 2 lines)
B: Text (Description, clipped with ellipses)
C: Text (Byline)
D: Image
FIG. 5G

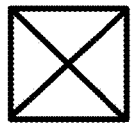 Adam Singer @singy
My weight decreased by 1.2lbs this week! Track my progress on @withings.com/k48Dc
Weight and Body over time
@singy is tracking his fitness goals with a Withings internet-connection scale. Try it out at http://withings.com
Withings @withings - Follow
FIG. 6B

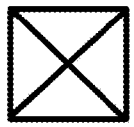
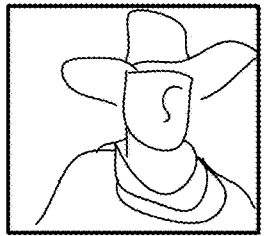
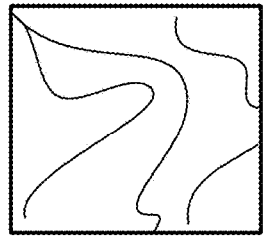
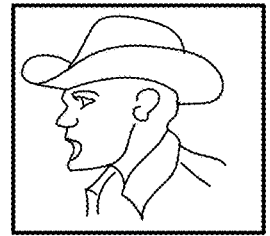
Adam Singer @singy
Soundtracking to Country Playlist on @rdio.
http://rd.io/ej732j
Country Playlist
23 songs
Rdio   @rdio - Follow
FIG. 6G

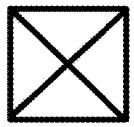
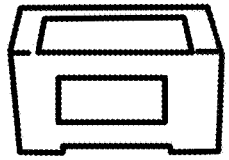
Adam Singer @singy
I am selling my Brother HL2230 Printer on @getyardsale. $89. http://yd.sl/ek7eS
Brother Printer HL 2230
Monochrome Printer
*$89*
The HL2230 is a compact monochrome laser printer. Perfect for small office or home office use, it features fast printing at up to 24ppm, up to 2400 x 600 dpi resolution for high-quality output...
Buy Now
Yardsale  @getyardsale - Follow
FIG. 6H

| Property | Value |
|---|---|
| twitter:card | "summary", "photo", or "player" |
| twitter:site | @username of website |
| twitter:site:id | Same as twitter:user, but the user's Twitter ID |
| twitter:creator | @username of content creator |
| twitter:creator:id | Twitter user ID of content creator |
| twitter:url | Canonical URL of the card content |
| twitter:description | Description of content (maximum 200 characters) |
| twitter:title | Title of content (max 70 charaters) |
| twitter:image | URL of image to use in the card |
| twitter:image:width | Width of image in pixels |
| twitter:image:height | Height of image in pixels |
| twitter:player | HTTPS URL of player iframe |
| twitter:player:width | Width of iframe in pixels |
| twitter:player:height | Height of iframe in pixels |
| twitter:player:stream | URL to raw video or audio stream |

FIG. 7A

```
<meta name="twitter:card" content="summary">
<meta name="twitter:site" content="@nytimes">
<meta name="twitter:creator" content="@SarahmaslinNir">
<meta name="twitter:url" content="http://www.nytimes.com/2012/02/19/arts/music/whitney.html">
<meta name="twitter:title" content="Parade of Fans for Houston's Funeral">
<meta name="twitter:description" content="NEWARK – The guest list and parade of limousines With celebrities emeging from them seemed more suited to a red carpet event in Hollywood or New York than a gritty stretch of Sussex Avenue near the former site of the James M. Baxter Terrace public housing project here.>
<meta name="twitter:image" content="http://graphics8.nytimes.com/images/
```

FIG. 7B

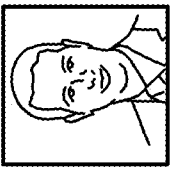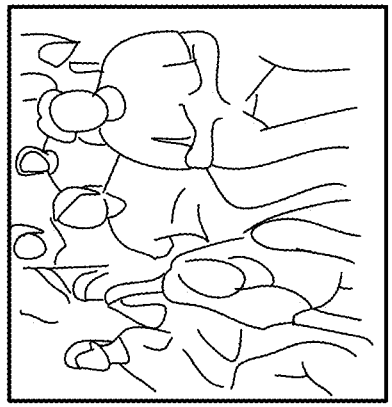

Richard Henry @richardhenry
That's a whole lot of people...myti.ms/yzg^Wq
☰ Hide summary ◄Reply ↻Retweet ★Favorite

Parade Fans for Houston's Funeral
By Sarah Maslin Nir @SarahMaslin
NEWARK – The guest list and the parade of limousines with celebrities emerging from them seemed a little more suited to a red carpet event in Hollywood...
The New York Times @rycarnes 9:03 PM Sep 27 via Twitter for Mac – View Tweet page

FIG. 7C

The New York Times summary
Parade of Stars and Fans for Houston's Funeral
By Sarah Maslin Nir
NEWARK – The guest list and the parade of limousines with celebrities emerging from them seemed more suited to a red carpet event in Hollywood or New York than to a gritty...
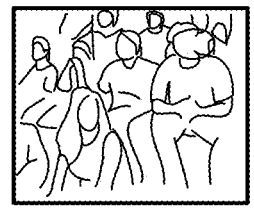
 Sarah Maslin Nir
@SarahMaslin 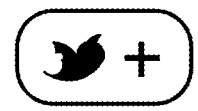
  The New York Times ✓
@rycarnes 
FIG. 7D

RENDERING MESSAGES HAVING AN IN-MESSAGE APPLICATION

CROSS-REFERENCE TO RELATED APPLICATIONS

This application is a divisional application of U.S. patent application Ser. No. 15/804,979, filed on Nov. 6, 2017, now allowed, which is a continuation of U.S. patent application Ser. No. 13/744,977, filed on Jan. 18, 2013, now U.S. Pat. No. 9,813,260 issued on Nov. 7, 2017 each of which is herein incorporated by reference in its entirety.

BACKGROUND

With the expansion of cellular, Wifi, cable, fiber, and other Internet access points and the growing ubiquity of internet-capable mobile devices, messaging systems have expanded their reach and influence in the areas of social/professional networking, real-time collaboration, events, and general communication. Previously, bandwidth and hardware limitations made it impossible to share large amounts of data in real-time. Today's messaging systems include peer-to-peer and subscriber-based sharing of data and information seamlessly among a variety of different devices.

Unlike the limitations of early messaging systems such as Short Message Service (SMS), messaging systems are now capable of receiving and propagating video, audio, images, and uniform resource locators (URLs) of a variety of different content among users. Surfacing this myriad of content in a consistent and meaningful way is non-trivial. The interests of the users, the platform, and the content providers must all be considered. A fragmented experience across devices, between users, and among content hosted between different providers can lead to a frustrating and difficult user experience.

SUMMARY

In general, in one aspect, the invention relates to a method for using an in-message application. The method can include: receiving a broadcast message from a client computing device; identifying, in the broadcast message, a reference to an external data provider; obtaining an identifier of the in-message application from the external data provider; using, by a computer processor, the identifier to identify a set of components of the in-message application, where placement of the set of components is defined by a visual structure of the in-message application, and where each of the set of components is a user interface (UI) element; associating data obtained from the external data provider with a component of the set of components; and serving the broadcast message and the data to a consumer client, where the consumer client renders the in-message application based on the visual structure.

In general, in one aspect, the invention relates to a system for using an in-message application. The system can include: a computer processor; an application repository storing a visual structure of the in-message application, where the visual structure defines placement of a set of components, and where each of the set of components is a user interface (UI) element; and an application engine executing on the computer processor and configured to: receive a broadcast message sent from a client computing device, identify, in the broadcast message, a reference to an external data provider, obtain an identifier of the in-message application from the external data provider, use the identifier to identify the set of components of the in-message application in the application repository, associate data obtained from the external data provider with a component of the set of components, and serve the broadcast message and the data to a consumer client, where the consumer client renders the in-message application based on the visual structure.

In general, in one aspect, the invention relates to a non-transitory computer readable medium including instructions for using an in-message application. The instructions include functionality to: receive a broadcast message from a client computing device; identify, in the broadcast message, a reference to an external data provider; obtain an identifier of the in-message application from the external data provider; use the identifier to identify a set of components of the in-message application, where placement of the set of components is defined by a visual structure of the in-message application, and where each of the set of components is a user interface (UI) element; associate data obtained from the external data provider with a component of the set of components; and serve the broadcast message to a consumer client, where the consumer client renders the in-message application based on the visual structure.

Other aspects of the invention will be apparent from the following description and the appended claims.

DESCRIPTION OF DRAWINGS

FIGS. 5A-5G show examples of components in accordance with one or more embodiments of the invention.

FIGS. 6A-6I show example renderings of in-message applications in accordance with one or more embodiments of the invention.

FIG. 7A shows an example set of in-message application tags in accordance with one or more embodiments of the invention.

FIG. 7B shows an example of web page metadata identifying an in-message application in accordance with one or more embodiments of the invention.

FIG. 7C shows an example rendering of an in-message application by a web client, in accordance with one or more embodiments of the invention.

FIG. 7D shows an example rendering of an in-message application by a mobile client, in accordance with one or more embodiments of the invention.

DETAILED DESCRIPTION

Figure 1:
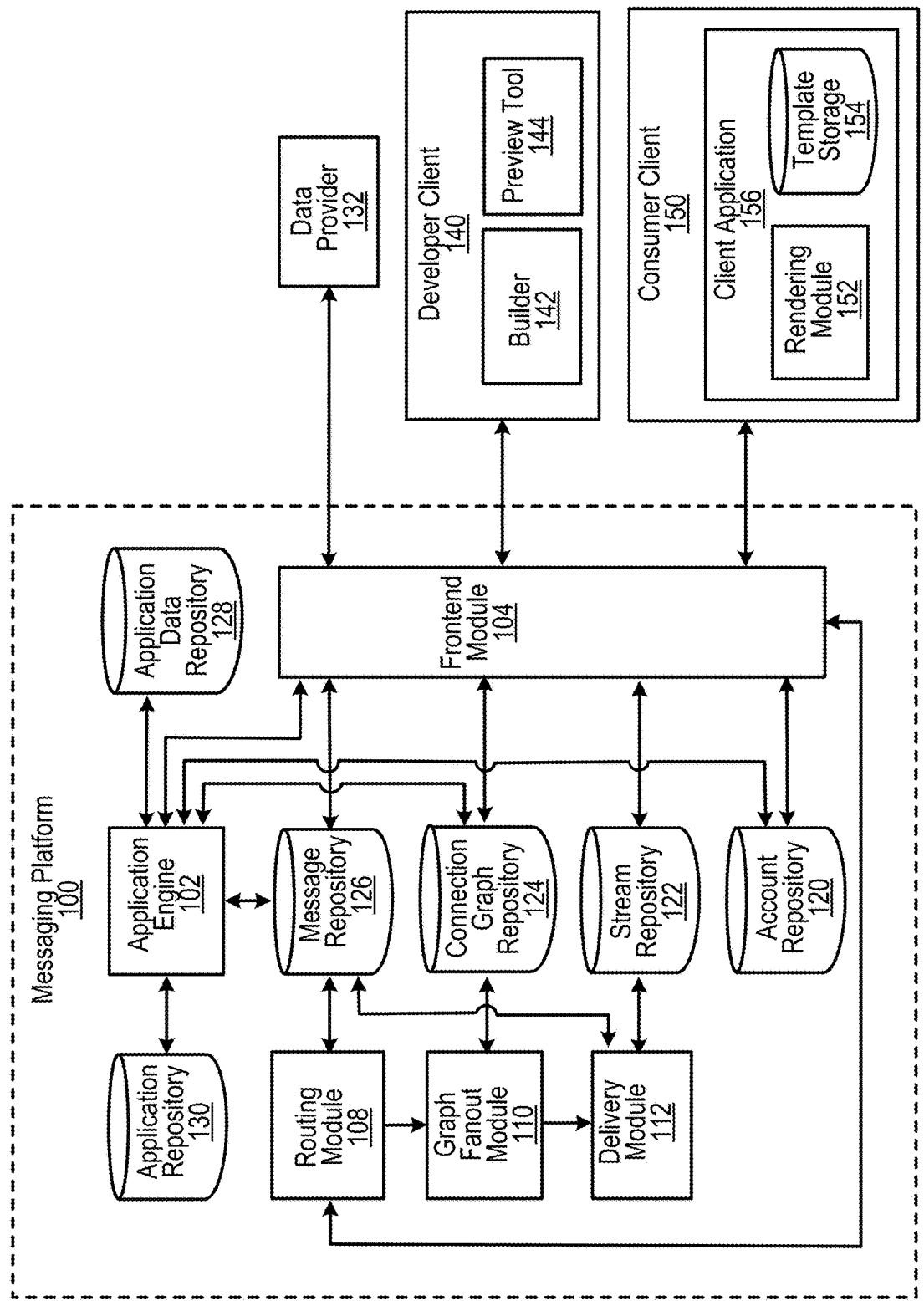
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for using an in-message application. A broadcast message including a reference (e.g., a URL) to an external data provider is received from a client computing device. The reference is used to obtain an identifier of the in-message application. One or more components of the in-message application are identified. Data is downloaded from the external data provider and associated with at least one of the components. The broadcast message and the data are then served to a consumer client computing device. The consumer client renders the in-message application according to a predefined visual structure.

FIG. 1 shows a messaging platform (100), a data provider (132), a developer client (140) including a builder (142) and a preview tool (144), and a consumer client (150) including a client application (156), a rendering module (152) and a template storage (154), in accordance with one or more embodiments of the invention. As shown in FIG. 1, messaging platform 100 has multiple components including a frontend module (104), an application engine (102), an application repository (130), an application data repository (128), a routing module (108), a graph fanout module (110), a delivery module (112), a message repository (126), a connection graph repository (124), a stream repository (122), and an account repository (120). Various components of the system of FIG. 1 may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g., a local area network (LAN), the Internet, etc.). Those skilled in the art will appreciate that there may be more than one of each separate component running on a device, as well as any combination of these components within a given embodiment of the invention.

In one or more embodiments of the invention, messaging platform 100 is a platform for facilitating real-time communication between one or more entities. For example, messaging platform 100 may store millions of accounts of individuals, businesses, and/or other entities (e.g., pseudonym accounts, novelty accounts, etc.). One or more users of each account may use messaging platform 100 to send messages to other accounts inside and/or outside of messaging platform 100. Messaging platform 100 may be configured to enable users to communicate in "real-time", i.e., to converse with other users with a minimal delay and to conduct a conversation with one or more other users during simultaneous sessions. In other words, messaging platform 100 may allow a user to broadcast messages and may display the messages to one or more other users within a reasonable time frame so as to facilitate a live conversation between the users. Recipients of a message may have a predefined graph relationship with an account of the user broadcasting the message. In one or more embodiments of the invention, the user is not an account holder or is not logged in to an account of messaging platform 100. In this case, messaging platform 100 may be configured to allow the user to broadcast messages and/or to utilize other functionality of messaging platform 100 by associating the user with a temporary account or identifier.

For purposes of this disclosure, an in-message application is an application for including one or more predefined components and/or primitives into a representation of a message posted to a messaging platform (e.g., messaging platform 100). The in-message application can include one or more data structures (e.g., a layout file, a template file, etc.) defining a visual structure of the components. In one or more embodiments of the invention, the in-message application is a public application available to a plurality of message authors for drafting messages using the in-message application.

In one or more embodiments of the invention, developer client 140 is a computing device used to create and publish an in-message application. Developer client 140 may be configured to create one or more primitives, components, and/or layouts, in accordance with various embodiments. Developer client 140 can further enable a user to draft a broadcast message and/or to preview one or more unpublished in-message applications using preview tool 144. In one or more embodiments, developer client 140 can then publish the application to messaging platform 100 in response to user input. Publishing the application can include uploading one or more layouts to messaging platform 100 to be stored in application repository 130.

In one or more embodiments of the invention, developer client 140 can be any computing device capable of defining a visual structure of an in-message application, defining one or more components, defining one or more primitives, publishing an in-message application, previewing a broadcast message or in-message application, and/or posting a broadcast message to messaging platform 100. Examples of a developer client (140) may include, but are not limited to, a laptop computer, a desktop computer, a server computer, a netbook, a tablet computer, and any other computing device having communication capability with messaging platform 100. Developer client 140 can utilize any of a number of advantageous interfaces, including a web-based client, a Short Messaging Service (SMS) interface, an instant messaging interface, an email-based interface, an application programming interface (API) function-based interface, a JavaScript Object Notation (JSON) interface and/or etc. to communicate (via a computer network) with one or more components of messaging platform 100.

In one or more embodiments of the invention, builder 142 includes functionality to create a layout defining a visual structure of an in-message application. The layout can be implemented as any data structure or set of related data structures defining on or more attributes of a visual structure of an in-message application. In one or more embodiments of the invention, the layout include component data defining placement of one or more components of an in-message application. For example, the layout may be implemented using one or more human readable text files containing the visual structure written in a platform independent format (e.g., a markup language such as Extensible Markup Language). Any platform independent format may be used, in accordance with various embodiments of the invention. In another example, the layout may be implemented as a compiled binary file (e.g., a library) accessible to one or more applications (e.g., builder 142) executing on the developer client 140 and/or a component of messaging platform 100.

In one or more embodiments of the invention, the visual structure is platform specific, or is specific to a category of client computing devices. For example, the visual structure can be applicable only to tablet devices of a particular size. In another example, a developer can define separate visual structures for different screen sizes, such that messaging platform 100 serves the appropriate visual structure based on information (i.e., screen dimensions) provided by each client device.

In one or more embodiments of the invention, a component is a user interface element for use in an in-message application. Examples of a component may include, but are not limited to, an article summary component, an image slideshow component, an image grid component, a chart component, a map component, an ecommerce component, audio playlist component, and a trigger component associated with an action (e.g., initiating purchase of a product, selecting a message as a favorite, rebroadcasting a message, etc.).

In one or more embodiments of the invention, the layout includes component data. Component data may include, in one or more embodiments, any data relevant to the placement, orientation, size, display, and/or attribute(s) of a component or one or more primitives associated with a component. For example, component data can include application data which is mapped to a particular component, such as text, images, videos, URLs, and/or etc. Examples of component data may further include any other data relevant to the component, such as font size, font color, border information, margin information, and background color.

In one or more embodiments of the invention, a primitive is a basic building block of a component. Examples of a primitive can include, but are not limited to, an image, textbox, player, container (which can include other primitives), box, circle, oval, ellipse, triangle, button, checkbox, radio button, scroll bar, slide bar, and/or any other element capable of being displayed within a broadcast message.

In one or more embodiments of the invention, builder 142 includes functionality to upload the layout to messaging platform 100. Builder 142 may, for example, upload the layout to frontend module 104. Frontend module 104 may then send the layout to application engine 102 to be stored in application repository 130. In one or more embodiments of the invention, uploading the layout to messaging platform 100 is performed in response to a request to publish the in-message application.

In one or more embodiments of the invention, builder 142 includes functionality to receive an identifier assigned to the in-message application. The identifier may be assigned by builder 142 or a component of messaging platform (e.g., application engine 102), in accordance with various embodiments of the invention. In one or more embodiments, the identifier can be embedded as metadata in an external resource (e.g., a web page) and may be used by messaging platform 100 to identify content intended for use with the in-message application. For example, a developer may embed metadata tags in a web page to indicate that content in the web page is intended for viewing with a particular in-message application. In this example, when a broadcast message is sent to messaging platform 100, it is parsed to identify a link to the external web page. The web page is then read to identify the identifier of the in-message application, and content from the web page is downloaded by application engine 102. Continuing the example, the broadcast message is posted and sent to multiple clients (along with the associated content) for viewing. Each client renders the in-message application according to the associated content and a visual structure of the in-message application.

In one or more embodiments of the invention, preview tool 144 includes functionality to create, in response to input from a user, a broadcast message including a reference to an external data provider (e.g., data provider 132). The broadcast message may include text, one or more references (e.g., a uniform resource locator (URL)), emoticons, usernames, tags, objects, images, videos, and/or any other data insertable into a message, in accordance with various embodiments of the invention. Upon receiving the broadcast message, messaging platform 100 may post the broadcast message (i.e., message), and make the broadcast message available to one or more clients based on graph relationships between an authoring account of the message and one or more other accounts. The broadcast message may be sent to the client with additional content, formatting, and/or other data, in accordance with various embodiments of the invention. For example, the broadcast message may include an image/video thumbnail, a product description, a title of a news article, data corresponding to one or more components of an in-message application, and/or any other data. In one or more embodiments, the broadcast message is modified by messaging platform 100 prior to posting. For example, a URL may be replaced by a shortened URL or a summary of an article.

Examples of an external data provider may include a web service, a web site, a server application, a mobile device of a user of the messaging platform, a data service and/or any other source of data accessible via a computer network (e.g., the Internet).

In one or more embodiments of the invention, preview tool 144 includes functionality to receive data obtained from the external data provider. In one example, application engine 102 downloads the data from the external data provider and provides the data to preview tool 144 via frontend module 104. In another example, preview tool 144 downloads the data to developer client 140 directly from data provider 132. The data may be obtained from the external data provider and provided to preview tool 144 from any other resource or component, in accordance with various embodiments of the invention. Examples of data obtained from the external data provider may include, but are not limited to, one or more images, videos, thumbnails, graphics, animations, user names, display names, audio segments, a text summary, a product description, a number of words of a web page, analytics data, location information, text (e.g., a first paragraph) from an article or other web page, location coordinates from a mobile device of a user, and any content relevant to an in-message application.

In one or more embodiments of the invention, preview tool 144 includes functionality to render, based on the visual structure of the in-message application, a preview of an in-message application including data obtained from the external data provider.

In one or more embodiments, the preview tool 144 is configured to identify a user selection of a rendering environment. The rendering environment is the client environment which the preview tool 144 simulates in rendering the preview. Thus, for example, the user may select, using a user interface of the preview tool 144, Apple Corporation's iOS, Google Corporation's Android, Google Corporation's Chrome web browser or any other client as the rendering environment. In one or more embodiments, preview tool 144 includes a template defining one or more parameters for each available rendering environment. The template may be any data structure or set of related data defining the output, display, and/or other requirements for simulating in-message applications in the corresponding rendering environment. The "simulation" of an in-message application can be a visual representation, approximation, and/or mock-up depicting one or more aspects of the visual appearance of the in-message application as it would appear when rendered on a client device, in accordance with various embodiments of the invention. In one or more embodiments, the preview functionality is performed entirely by developer client 140 (i.e., without server-side processing). Thus, the layout can be published after a preview of an in-message application is generated and approved by a developer using the developer client 140.

Conversely, in one or more embodiments of the invention, generating a preview of an in-message application (i.e., simulating the in-message application) can involve receiving an actual broadcast message from messaging platform 100. In this case, the broadcast message may be visible only to preview tool 144 and may be generated based on a temporary identifier of a draft in-message application (e.g., using a draft layout, etc.). For example, preview tool 144 can upload a draft layout to application engine 102 (via frontend module 104) and can receive a temporary identifier assigned to the corresponding in-message application. In this example, preview tool 144 sends a broadcast message including a link to an external web page to the application engine 102. The web page can include the temporary identifier in metadata. In another example, builder 142 includes functionality to obtain application metadata from a user. In this example, for purposes of previewing an in-message application, preview tool 144 applies the user-supplied metadata to a web page linked to by the broadcast message. In this way, developers may not be required to modify any web pages (e.g., in order to include application metadata tags) in order to preview an in-message application.

In one or more embodiments of the invention, builder 142 includes functionality to receive, from the user, a request to publish the in-message application. Builder 142 can display a user interface including a preview of the in-message application along with an option to publish the application. The builder can also, in one or more embodiments, display a standalone option to publish the in-message application without preview.

In one or more embodiments of the invention, builder 142 includes functionality to publish the in-message application in response to the request. Publishing the application may include transmitting one or more items to application engine 102 via frontend module 104, in accordance with various embodiments of the invention. Examples of items transmitted to application engine 102 may include, but are not limited to, one or more layouts, one or more component definitions, identifiers of one or more components/primitives, application metadata (e.g., font, text size, color, and etc.) and/or any other data required to deploy the in-message application to messaging platform 100.

In one or more embodiments of the invention, preview tool 144 includes functionality to receive, from the user, a request to post a previewed broadcast message. This request may be submitted concurrently with, or separately from the publish request, in accordance with various embodiments. The preview tool 144 can then post the previewed broadcast message in response to the request from the user.

In one or more embodiments of the invention, developer client 140 includes a validator tool (not shown). The validator tool is configured to validate application metadata written for associating content in an external data provider with an in-message application. In one or more embodiments, the validator tool receives the application metadata from a user of the developer client, checks syntax, reads one or more values from the metadata (e.g., an identifier of an in-message application, identifiers of one or more components/primitives, etc.) and sends the values to application engine 102 (via frontend module 104) for confirmation. The validator tool then receives a message from application engine 102 confirming that the values match the definition of the in-message application and/or that all required values are present. If one or more of the values do not match the requirements/identifier of the in-message application, the validator tool receives an error message indicating the mismatched or unfound value(s). In one or more embodiments, if the in-message application has not yet been published, the validator performs the value matching locally (i.e., without sending the values to application engine 102 for validation). In one or more embodiments, the validator tool is configured to access one or more external data providers to confirm that data referenced within the metadata (e.g., data mapped to a component) is available and valid. If the validator tool determines that the data is unavailable or invalid, an error message can be displayed to a user of developer client 140. In one or more embodiments, the validator tool is a component of builder 142, or is a separate application communicatively coupled to builder 142. The validator tool can be implemented as a web application executing within a browser of developer client 140 or as a local client application, in accordance with various embodiments.

In one or more embodiments of the invention, developer client 140 includes all functionality and components of consumer client 150 (though not shown in FIG. 1), in addition to the functionality described with regard to builder 142 and preview tool 144.

In one or more embodiments of the invention, builder 142 is a software application or a set of related software applications configured to communicate with any number of other components (e.g., preview tool 144, application engine 102, frontend module 104). Builder 142 can implemented as a component or plugin to another client application such as a messaging application.

In one or more embodiments of the invention, preview tool 144 is a software application or a set of related software applications configured to communicate with any number of other components (e.g., builder 142, application engine 102, frontend module 104). Preview tool 144 can be implemented as a component of builder 142 or any other application executing on the client.

Builder 142 and/or preview tool 144 can be implemented as web applications configured to execute within a browser of developer client 140, in accordance with various embodiments of the invention. Alternatively, in one or more embodiments, builder 142 and/or preview tool 144 can be implemented as native client applications executing on developer client 140. Some or all of the functionality of builder 142 and/or preview tool 144 can be integrated within or performed by an operating system of developer client 140, in accordance with various embodiments.

In one or more embodiments of the invention, application engine 102 includes functionality to receive a visual structure of an in-message application. Application engine 102 can receive the visual structure in a platform independent or dependent form from a client computing device, in accordance with various embodiments. In one or more embodiments, application engine 102 receives a platform independent layout including the visual structure. Application engine 102 then converts the layout into one or more platform dependent templates, each template corresponding to an associated rendering environment of a client device. In one or more embodiments, application engine 102 includes functionality to send a template to a client in response to a request from the client. The template may then be utilized by the client to render the in-message application within a representation of one or more messages based on the visual structure. The layout and/or template may be platform independent or platform dependent and may include similar or identical information, in accordance with various embodiments.

In one or more embodiments of the invention, application engine 102 includes functionality to define one or more client-specific attributes of the visual structure. For example, application engine 102 may define specific dimensions and/or placement of one or more components of the in-message application for a predefined client environment. Thus, while the ordering, relative size, and/or relative orientation of one or more components can be included in the visual structure (e.g., in a platform independent form), the absolute dimensions, size, and/or ordering of the components may be assigned by application engine 102 for each client environment (e.g., in platform dependent form). Other examples of client-specific attributes defined by application engine 102 may include, but are not limited to, component sizes (e.g., a minimum or standard thumbnail image size for the client env., minimum textbox height for the client env., etc.), font information, color information (e.g., where screen size/resolution affects readability of fonts/colors), and/or any other client-specific data associated with rendering an in-message application. In one or more embodiments, the client-specific attributes are sent to developer client 140 for approval by a user who created the in-message application. Alternatively, in one or more embodiments, the client specific attributes are manually defined by the user of developer client 140 or a representative of messaging platform 100 using an interface to application engine 102.

In one or more embodiments of the invention, application engine 102 includes functionality to assign an identifier to an in-message application. Application engine 102 may assign the identifier in response to receiving a layout from a client computing device (e.g., when the in-message application is published). The identifier may be any method of uniquely referencing and/or identifying the in-message application (e.g., a randomly assigned unique numeric value).

In one or more embodiments of the invention, application engine 102 includes functionality to obtain data from the external data provider (e.g., data provider 132). Application engine 102 may download the data according to a predefined protocol for accessing external resources. For example, application engine 102 may read a web page, parse metadata tags from the web page, and store text, images, videos, and/or other content from the web page in application data repository 128. In another example, application engine 102 downloads data in JavaScript Object Notation (JSON) format from an external data service. In this example, the JSON blob includes metadata identifying an in-message application, various different components of the in-message application, as well as data associated with those components. Examples of data downloaded by the external data provider can include, but are not limited to, web pages (e.g., a news article, blog post, etc.), images, videos, text, files (e.g., a markup file), and/or any other data.

In one or more embodiments of the invention, application engine 102 includes functionality to receive a broadcast message from a client computing device (e.g., consumer client 150). In one or more embodiments of the invention, the application engine 102 receives the broadcast message in conjunction with a request to post the broadcast message to messaging platform 100. The broadcast message may include a text string entered by a user, one or more uniform resource locators (URLs) or other references, and/or any other content (e.g., images, video, audio) which can be included in a message posted to messaging platform 100. In one example, a user of consumer client 150 authors the following broadcast message: "Check out the latest news on our blog! http://blog.twitter.com/".

In one or more embodiments of the invention, application engine 102 includes functionality to identify, in the broadcast message, a reference to an external data provider (data provider 132). The reference may be a URL or other data pointing to a location accessible via a computer network. For example, the reference may point to an address of a web page such as "http://blog.twitter.com/2012/12/when-musicians-talk-theworldislistening.html".

Data provider 132 can be any external source of data accessible by one or more components of messaging platform 100 and/or a client computing device. For example, data provider 132 may be a resource or location in a web server or a set of related web servers of a network distributed system.

In one or more embodiments, application engine 102 includes functionality to obtain the identifier of an in-message application from the external data provider (e.g., data provider 132). Application engine 102 may access a resource provided by data provider 132 in response to identifying a reference to the resource in a broadcast message sent from a client computing device. For example, application engine 102 can read a web page hosted by data provider 132, and then parse the web page to identify one or more metadata tags, as follows:

<meta name="twitter: card" content="summary">

In this example, the metadata tag named "twitter:card" includes the identifier "summary" which uniquely identifies an in-message application. Any other type of identifier, file format, or protocol may be used to identify the in-message application, in accordance with various embodiments of the invention.

In one or more embodiments of the invention, application engine 102 includes functionality to use the identifier to identify a visual structure of the in-message application, where the visual structure defines placement of a set of components. The visual structure can be stored in application repository 130 in any form, in accordance with various embodiments. For example, the visual structure may be stored as a file in a distributed file system or a database management system (DBMS).

In one or more embodiments of the invention, application engine 102 includes functionality to associate data obtained from the external data provider (e.g., data provider 132) with a component of the set of components. In one or more embodiments, the mappings (e.g., metadata tags) of data to one or more components of the in-message application are included in the data downloaded from the external data provider. Application engine 102 can be configured to read and then store the mappings and the associated data in application data repository 128. The data can include one or more photos, images, videos, text, and/or other content obtained from data provider 132 and stored in application data repository 128.

In one or more embodiments of the invention, application engine 102 includes functionality to serve application data to a consumer client, where the consumer client renders the in-message application based on the application data and a visual structure. In various embodiments, the visual structure, corresponding data, and/or the reference to the external data provider can be sent to the client separately from the broadcast message. In one or more embodiments, the client (e.g., client application 156) includes functionality to obtain some or all of the associated data from the external data provider directly using the reference.

In one or more embodiments of the invention, messaging platform 100 includes functionality to send (via front end module 104 and application engine 102) the broadcast message, associated data, and/or the visual structure to a consumer client. In one or more embodiments, the visual structure and/or client-specific attributes of the visual structure are sent to the client separately (e.g., in a platform dependent format). For example, messaging platform 100 can send a template file including the visual structure and client-specific attributes to the client in response to a request. In this example, the client caches the template and uses the template to render the in-message application.

In one or more embodiments of the invention, consumer client 150 is a computing device used to create and publish an in-message application. Consumer client 150 may be configured to download one or more message streams including any number of broadcast messages from frontend module 104. Consumer client 150 can then display the broadcast messages to a user. If the broadcast message is associated with an in-message application, consumer client 150 can render the in-message application within a representation of the broadcast message using data associated with the in-message application (e.g., a template). Consumer client 150 can be configured to render the in-message application using a web browser, a mobile application, or any other client application (156), in accordance with various embodiments of the invention.

In one or more embodiments of the invention, consumer client 150 can be any computing device capable of displaying one or more broadcast messages to a user. Examples of a consumer client (150) may include, but are not limited to, a laptop computer, a desktop computer, a server computer, a netbook, a tablet computer, and any other computing device having communication capability with messaging platform 100. Consumer client 150 can utilize any of a number of advantageous interfaces, including a web-based client, a Short Messaging Service (SMS) interface, an instant messaging interface, an email-based interface, an API function-based interface, and etc. to communicate (via a computer network) with one or more components of messaging platform 100.

In one or more embodiments of the invention, client application 156 includes functionality to download a broadcast message including data obtained from an external data provider (e.g., data provider 132). For example, the broadcast message may be sent in JSON format. In one or more embodiments of the invention, client application 156 includes functionality to identify, based on the broadcast message, an identifier of an in-message application. Client application 156 can be configured to extract the identifier from the broadcast message or data associated with the broadcast message.

In one or more embodiments of the invention, client application 156 includes functionality to determine that a template corresponding to the in-message application is not stored in template storage 154. In one or more embodiments, the template is a set of platform dependent data including the visual structure and/or one or more client-specific attributes of the visual structure.

In one or more embodiments of the invention, client application 156 includes functionality to download the template from messaging platform 100 (e.g., via frontend module 104) in response to determining that the platform dependent template is not stored in template storage 154. Client application 156 can be configured to then store the template in template storage 154.

In one or more embodiments of the invention, rendering module 152 includes functionality to render the in-message application based on the template. Rendering the in-message application can include generating a visual representation of the broadcast message. The visual representation can include any combination of primitives, components, text, images, video, graphics, animations, user interface controls (e.g., buttons, check boxes, text boxes, menus, etc.), and other relevant content.

In one or more embodiments of the invention, client application 156 includes functionality to identify an action associated with the in-message application. An action can be performed in response to a calculated engagement metric (discussed below) and/or a user's engagement with a component of the broadcast message. In one or more embodiments, multiple actions can be performed in response to a single user engagement. Examples of a user engagement can include, but are not limited to, rebroadcasting a message, favoriting/liking a message, replying to a message, selecting a purchase option in a component of the broadcast message, selecting a vote option in a component of the broadcast message, entering a bid to purchase a product in a component of the broadcast message, selecting a purchase option in a component of the broadcast message, and selecting an audio playback option in a component of the broadcast message.

In one example, a broadcast message includes a survey component requesting input from a user. The survey component includes an option to select one of three different radio buttons and a "submit response" button. Upon selecting one of the radio buttons and clicking the "submit response" button, client application 156 performs the action of sending the selected data (i.e., the survey response) to application engine 102 via frontend module 104. In this example, application engine 102 then aggregates the data and provides a report including results based on the aggregated data to the authoring account of the broadcast message. In one or more embodiments of the invention, the action is not associated with a particular component, but is associated with one or more predefined engagements with the broadcast message. Examples of an action performed in response to user input can include, but are not limited to, sending a coupon to an account of a user in response to detecting that the user has favorited/liked/rebroadcasted/replied to the broadcast message, unlocking a promotional offer in response to detecting a predefined number of purchase requests, updating a chart component of the broadcast message in response to detecting selection of a vote button in another component of the message, initiating audio playback (e.g., of a stream or single file) in response to detecting selection of a play button in a component, submitting a location coordinate, establishing a follower/friend/subscriber relationship between an account of a user of the consumer client and an authoring account of the broadcast message, and/or any other action associated with a user input.

In one or more embodiments of the invention, client application 156 includes functionality to send a request to perform one or more actions to the messaging platform (100). The request may be received and handled by application engine 102, or any other component of messaging platform 100, depending on a type of action requested. Actions and/or various steps of a single action can be performed by client application 156 and/or a component of messaging platform 100 (e.g., application engine 102), in accordance with various embodiments of the invention.

In one or more embodiments of the invention, client application 156 is a web browser and does not require a platform dependent template in order to render in-message applications. Instead, the web browser receives broadcast messages sent from a web application programming interface (API) of frontend module 104 and renders relevant in-message applications within a browser window. The broadcast messages sent for display in a web browser are sent with associated rendering data interpretable and executable by a standard web browser. Resultantly, in one or more embodiments, no template storage 154 exists when the client application 156 is a web browser. Alternatively, in one or more embodiments, template storage 154 is a cache of the web browser and stores data associated with rendering one or more in-message applications.

In one or more embodiments of the invention, application engine 102 includes functionality to aggregate a set of engagement data associated with one or more in-message applications. Application engine 102 can be configured to obtain engagement data from any number of consumer clients. Engagement data can include but are not limited to, number of expanded views of a broadcast message, votes submitted by a survey component, favorites/likes/rebroadcasts of a broadcast message, purchases made using a purchase component of a broadcast message, numbers of in-message applications using a custom component and data from each of those in-message applications, number of clicks per broadcast message and/or component, referral statistics/analytics for one or more external web pages linked to by a broadcast message, and any other aggregated data associated with an in-message application.

In one or more embodiments of the invention, application engine 102 includes functionality to calculate one or more engagement metrics based on the engagement data. An engagement metric can be any value representing one or more types of engagement with an in-message application. Examples of an engagement metric can include, but are not limited to, an average number of seconds per session of a streaming audio component, a total number of votes for a survey option, an average number of views per broadcast message, a number of rebroadcasts/likes/favorites/etc. of a broadcast message, and/or any other value derived from engagement data. In one or more embodiments, application engine 102 includes functionality to compare an engagement metric with a predefined threshold. Application engine 102 can be configured to determine that the engagement metric exceeds (or meets) the threshold. In one or more embodiments, application engine 102 and/or client application 156 is configured to perform an action in response to determining that the threshold is exceeded (or met).

In one or more embodiments of the invention, application engine 102 includes functionality to provide a report including one or more calculated engagement metrics. The report can be provided to an authoring account of a broadcast message using an in-message application and/or any other entity authorized by a user of the account, in accordance with various embodiments of the invention.

In one or more embodiments of the invention, application engine 102 includes functionality to maintain permissions data. Application engine 102 can be configured to enable or disable content from specific data providers and/or in-message applications based on the permissions data. In one or more embodiments, application engine 102 is configured to receive permissions data and/or updates to permissions data from an administrator (e.g., an employee of the messaging platform or a user of a specific account). For example, application engine 102 can maintain a whitelist and blacklist of data providers. In this example, each data provider is identified by a domain name and an identifier of their account with the messaging platform. Application engine 102 allows whitelisted data providers to have access to in-message applications, while blocking blacklisted data providers from usage of in-message applications.

Figure 8:
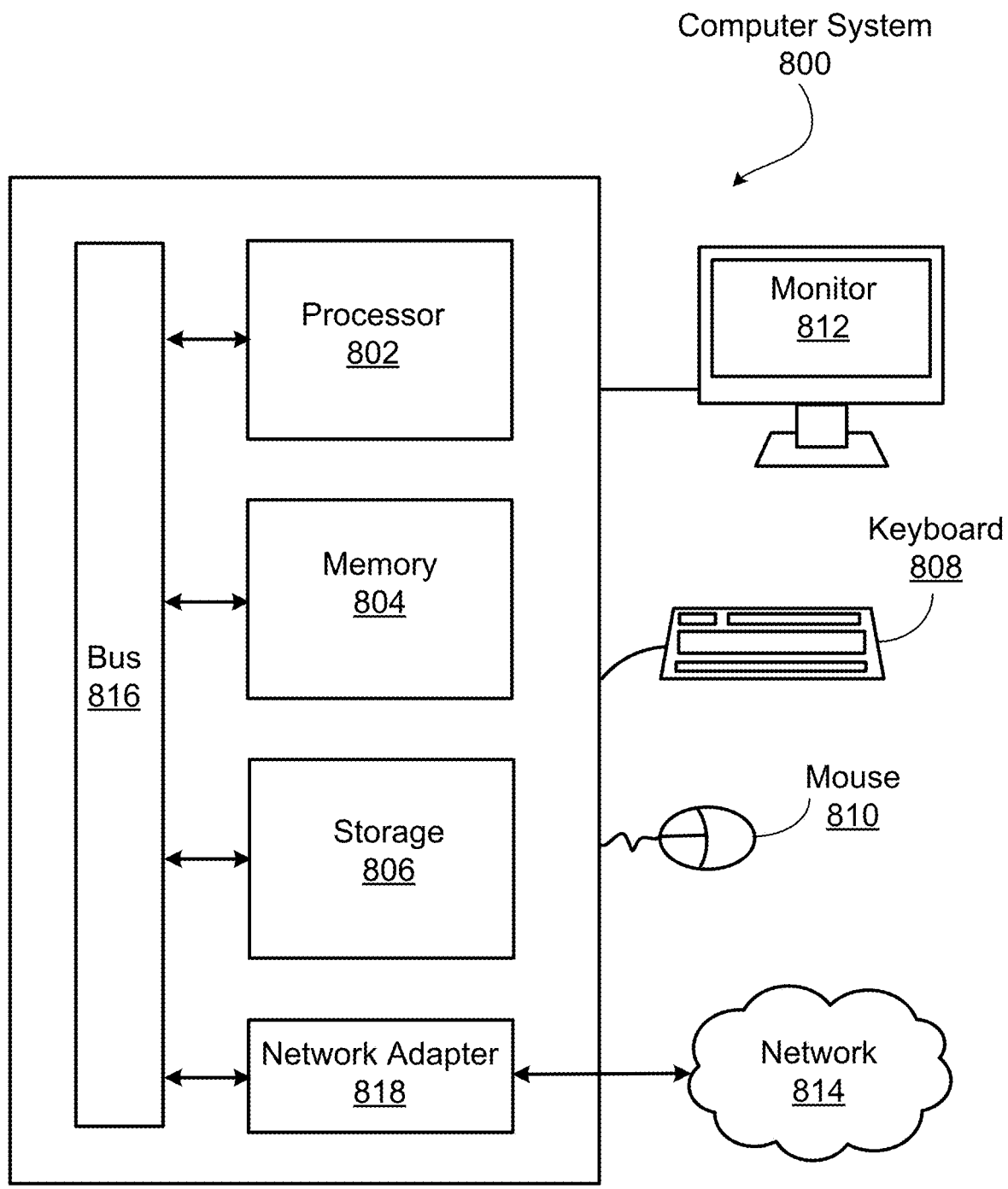
FIG. 8 shows a computer system in accordance with one or more embodiments of the invention.

In one or more embodiments of the invention, application engine 102 is a software application or a set of related software applications configured to execute on one or more hardware processors (e.g., processor 802 of FIG. 8, discussed below). Application engine 102 can be a web application in a server of a data center and/or a cloud computing application in a network distributed system. Alternatively, one or more components of application engine 102 can reside in a personal computing device of a user (e.g., developer client 140, consumer client 150).

In one or more embodiments of the invention, one or more of the data repositories (message repository 126, connection graph repository 124, stream repository 122, account repository 120, application repository 130, and application data repository 128) is a database and/or storage service residing on one or more servers. For example, one or more of the data repositories may be implemented as a storage service using service-oriented architecture (SOA) and configured to receive requests for data and to provide requested data to other components of messaging platform 100. In another example, message repository 126 may include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application can be used, in accordance with various embodiments of the invention.

In one or more embodiments of the invention, one or more of the data repositories (message repository 126, connection graph repository 124, stream repository 122, account repository 120, application repository 130, and application data repository 128) is a separate application or set of applications residing on one or more servers external (and communicatively coupled) to messaging platform 100. Alternatively, in one or more embodiments of the invention, one or more of the data repositories may be an integrated component of messaging platform 100 and/or may reside, either partially or entirely, on one or more common hardware devices (e.g., a server).

In one or more embodiments of the invention, routing module 108 includes functionality to receive one or more messages and to store the messages in message repository 126. Routing module 108 may be configured to assign an identifier to the message and to notify graph fanout module 110 of a sender of the message.

In one or more embodiments of the invention, graph fanout module 110 includes functionality to retrieve graph data from connection graph repository 124 and to use the graph data to determine which accounts in messaging platform 100 should receive the message. The graph data, for example, can reflect which accounts in the messaging platform are "following" a particular account and are, therefore, subscribed to receive status messages from the particular account.

In one or more embodiments of the invention, the delivery module 112 includes functionality to receive a list of accounts from graph fanout module 110 and the message identifier generated by routing module 108 and to insert the message identifier into stream data associated with each identified account. The delivery module 112 may then store the message list in stream repository 122. The stream data stored in stream repository 122 can make up one or more streams associated with one or more accounts of messaging platform 100. A stream may be a dynamic list of messages associated with one or more accounts or can reflect any arbitrary organization of messages that is advantageous for the user of an account.

In one or more embodiments of the invention, frontend module 104 is a software application or a set of related software applications configured to communicate with external entities (e.g., data provider 132, developer client 140, consumer client 150). Frontend module 104 may include an application programming interface (API) and/or any number of other components used for communicating with entities outside of messaging platform 100. The API may include any number of specifications for making requests from and/or providing data to messaging platform 100. For example, a function provided by the API may provide broadcasted messages to a consumer client (e.g., consumer client 150).

In one or more embodiments of the invention, frontend module 104 is configured to use one or more of the data repositories (e.g., message repository 126, connection graph repository 124, stream repository 122, and/or account repository 120) to define streams for serving messages (i.e., stream data) to a user of the account on messaging platform 100. A user can use any client (e.g., consumer client 150) to receive the messages. For example, where the user uses a web-based client to access messaging platform 100, an API of frontend module 104 can be utilized to define one or more streams and/or to serve the stream data to the client for presentation to the user. Similarly, different forms of message delivery can be handled by different modules in frontend module 104. In one or more embodiments of the invention, the user can specify particular receipt preferences which are implemented by frontend module 104.

Figure 2:
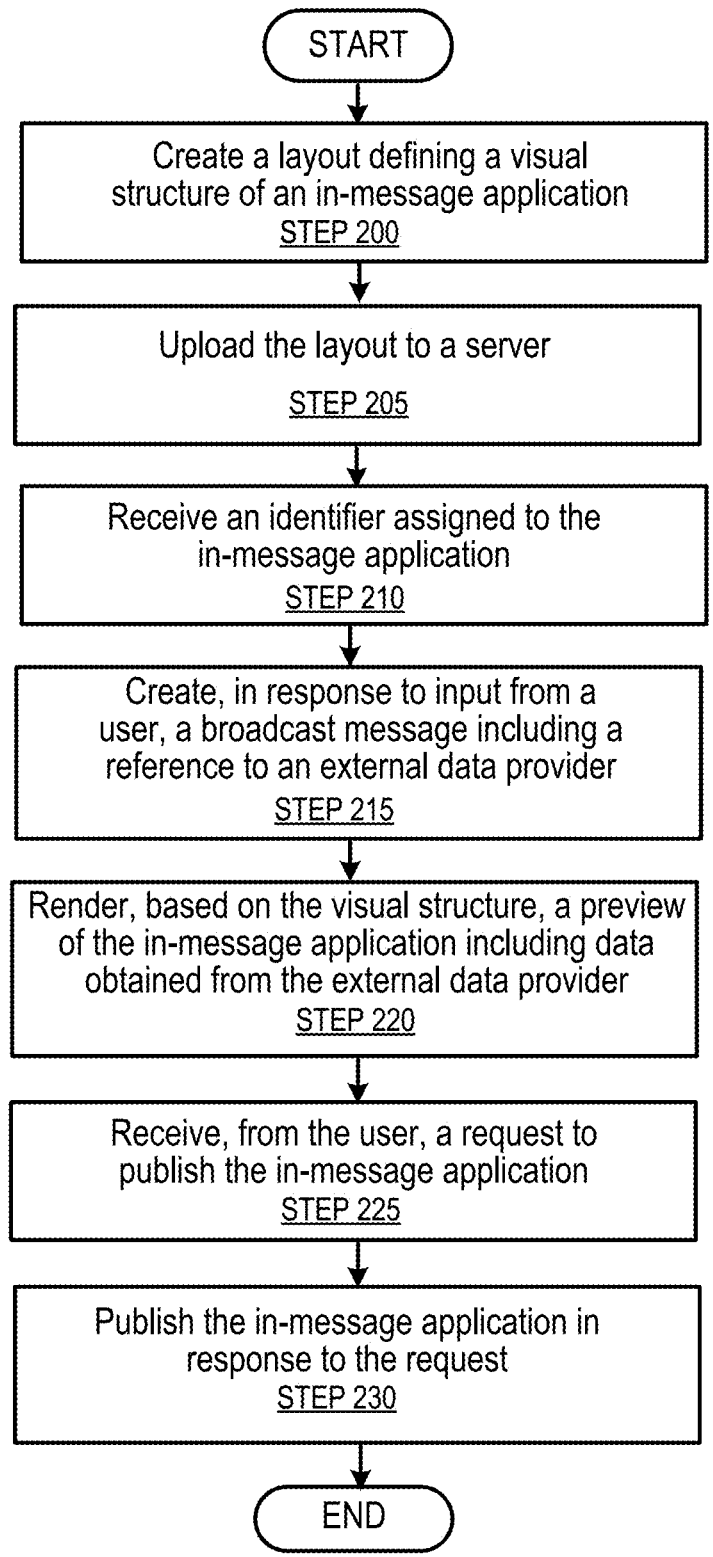
FIGS. 2-4 show flowcharts in accordance with one or more embodiments of the invention.

FIG. 2 shows a flowchart of a method for using an in-message application. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In STEP 200, a layout defining a visual structure of an in-message application is created. The layout can be created by an administrator of a messaging platform or by a third party developer, in various embodiments of the invention. In STEP 205, the layout is then uploaded to a server. In one or more embodiments of the invention, the server is a component of a messaging platform (e.g., frontend module 104 of FIG. 1, discussed above).

In STEP 210, an identifier assigned to the in-message application is received. The identifier can be a temporary identifier or a permanent identifier and can be assigned by the server or client, in accordance with various embodiments. For example, a developer client can request the identifier from the server and display the identifier to a developer using the client. In this example, the developer then uses the identifier as metadata in one or more web pages. In another example, the developer client submits a request to the server to publish an in-message application. In this example, the server responds to the client with the identifier upon publishing the in-message application.

In STEP 215, a broadcast message including a reference to an external data provider is created in response to input from a user. In one or more embodiments, the broadcast message is authored by a user of the developer client either prior to or after publishing the in-message application. For example, the broadcast message can include a URL and some user-entered text, as follows: "Check out this link! http://blog.twitter.com/".

In STEP 220, a preview of the in-message application is rendered based on the visual structure. In one or more embodiments, the preview includes data (i.e., content) obtained from the external data provider. Rendering the preview can involve obtaining content and metadata from the external data provider. For example, metadata obtained from the external data provider can map the content to one or more components of the in-message application. The preview can then be rendered by displaying the content within the associated components (e.g., according to a predefined visual structure). In one or more embodiments, the metadata can include an identifier of the in-message application.

In one or more embodiments, no identifier of the in-message application is required in order to preview an in-message application. For example, content from the external data provider can explicitly be mapped (e.g., by a user of a preview UI) to the in-message application without the use of an identifier. In one example, a user creates a layout defining a visual structure of an in-message application using a builder tool executing on a developer client. In this example, the builder displays an option to preview the in-message application. Upon selecting the option, a new user interface is displayed in which the user enters a broadcast message including a URL. The builder obtains metadata from an external data provider referenced by the URL and uses the metadata to map content from a web page to components of the in-message application. The preview of the in-message application is then rendered accordingly.

In STEP 225, a request to post the broadcast message is received from the user. For example, the request can be obtained from a user interface simultaneously displaying the preview. In STEP 230, the broadcast message is posted in response to the request. Posting the broadcast message can involve sending the broadcast message to frontend module 104 to be fanned out to any number of accounts having a predefined graph relationship with the posting account.

Figure 3:
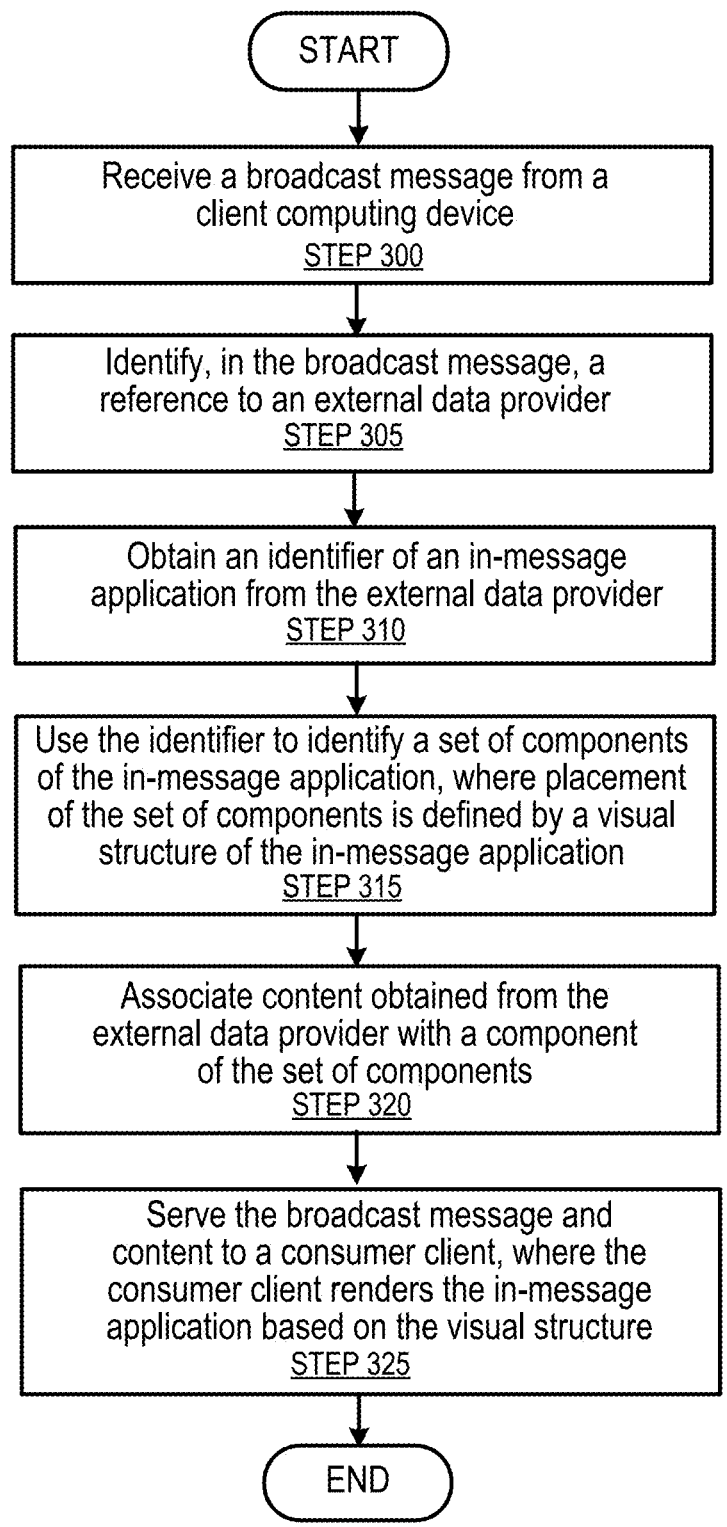

FIG. 3 shows a flowchart of a method for using an in-message application. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 3 should not be construed as limiting the scope of the invention.

In STEP 300, a broadcast message is received from a client computing device. The broadcast message can be received by a component of a messaging platform (e.g., frontend module 104 of FIG. 1, discussed above) and can be authored by a user of a client computing device or can be automatically generated by a software application. For example, a software application can be configured to automatically generate and post a broadcast message for each new article posted to a website of a periodical or news organization.

In STEP 305, a reference to an external data provider is identified in the broadcast message. The reference can be identified by parsing the broadcast message and identifying text formatted according to a predefined syntax. An identifier of an in-message application is obtained from the external data provider (STEP 310) (e.g., from metadata in a web page) and the identifier is used to identify a visual structure of the in-message application (STEP 315). Obtaining the identifier may involve making a predefined application programming interface call (API) to the external data provider, or reading data from a resource residing on the external data provider. Additional metadata, including one or more mappings of content to components of the in-message application can be obtained from the external data provider and/or from one or more other resources referenced by the external data provider, in accordance with various embodiments.

In STEP 320, content obtained from the external data provider is associated with at least one component of the set of components. In one or more embodiments, content can be obtained concurrently, prior to, or after obtaining the metadata. Furthermore, content can be obtained from the same external provider referenced by the broadcast message, or from any other resource, in accordance with various embodiments. Thus, in one or more embodiments, one or more of STEPS 310-320 can be performed concurrently, or in any different order. For example, a web page can be read in its entirety from a web server. In this example, the web page is then parsed and specific content is then downloaded from the web server as required by the in-message application. In another example, the external data provider is a repository storing all required information (e.g., metadata, content, and/or identifier) in one or more accessible files. The entire set of files is downloaded and subsequently read to identify the required information. In one or more embodiments, content mapped to one or more components is obtained from the external data provider by the messaging platform, the client, or both (e.g., depending on the availability of the content).

In STEP 325, the broadcast message and content are served to a consumer client. The consumer client renders the in-message application based on the visual structure. In one or more embodiments, broadcast message can be sent to the consumer client in response to a request received from the consumer client and in any number of separate messages. For example, the content associated with one or more components can be sent in any number of messages and from any number of different sources. In another example, broadcast messages are constructed and stored in a message repository and application data is stored in an application data repository. In this example, upon receiving a request to serve the message to a client, if the message is associated with an in-message application, required application data is retrieved from the application data repository and sent to the client in conjunction with the requested broadcast message.

Figure 4:
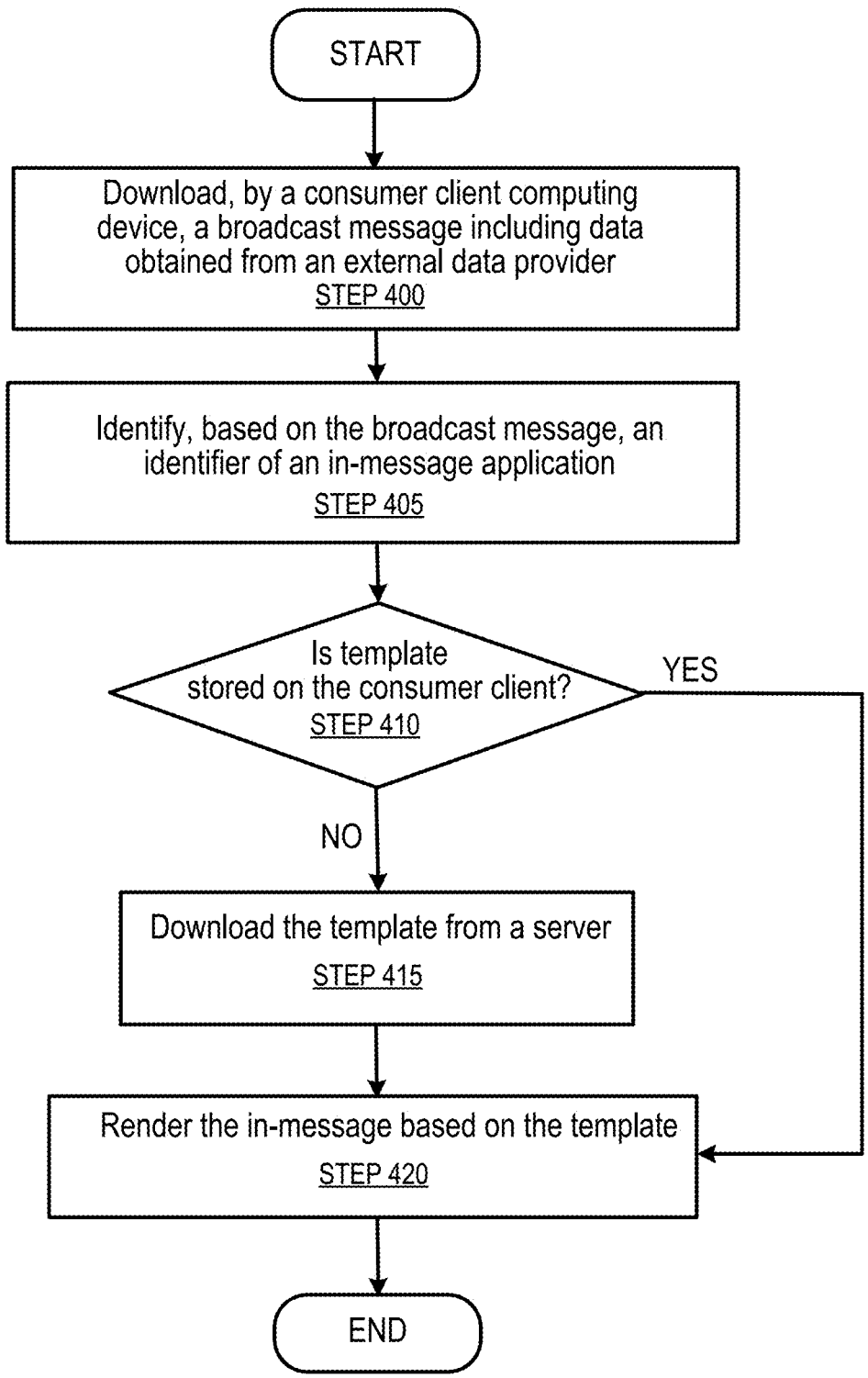

FIG. 4 shows a flowchart of a method for using an in-message application. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 4 should not be construed as limiting the scope of the invention.

In STEP 400, a broadcast message including data obtained from an external data provider is downloaded by a consumer client. The broadcast message can be downloaded at once, or in separate parts, in accordance with various embodiments. For example, content mapped to various components, dynamic content (e.g., time-sensitive content such as weather, stock quotes, etc.), content obtained from different data providers, and/or various other parts of the broadcast message can be downloaded by the client before, during, and/or after rendering of the in-message application.

In STEP 405, an identifier of an in-message application is identified based on the broadcast message. For example, the identifier can be identified as a numerical value within or otherwise associated with the broadcast message.

In STEP 410, it is determined whether a template corresponding to the in-message application is stored on the consumer client. The template can be any data structure or set of related data structures defining at least a portion of the visual structure of the in-message application. For example, in a web-based client, the template can be stored within the cache of a web browser. Alternatively, in another example, the web-based client does not require usage of a template, and STEPS 410 and 415 are skipped (e.g., the visual structure is sent to the client in conjunction with the broadcast message). Templates may be platform specific, required, optional, or not utilized, depending on a platform of the client, in accordance with various embodiments. If it is determined that the template is stored on the client, the process proceeds to STEP 420. If it is determined that the template is not stored on the client, the process proceeds to STEP 415.

In STEP 415, the template is downloaded from a server. In one or more embodiments, the template can be downloaded at any time based on availability, network connectivity of the client, modifications to the template which are pushed/pulled from the server, and/or any other reason.

In STEP 420, the in-message application is rendered based on the template. For newly obtained content or modifications to existing content, in one or more embodiments, the in-message application is re-rendered in response to obtaining the new content. In one example, a rendering of the in-message application is updated to include different content as the content becomes available and/or when the external content changes.

In one example, a broadcast message can be displayed without rendering the in-message application due to the template not being available at the time the message is displayed. In this example, the broadcast message is simply posted as a textual message and/or a message without any content relevant to an in-message application. The URL of the external data provider can be used to perform any form of message expansion, but no application-specific rendering is performed. Continuing the example, upon receiving the template from the server, the client renders the in-message application using content mapped to specific components and based on the visual structure defined by the template. Furthermore, application logic, actions, and/or other functionality is enabled and ready for user engagement. Thus, in this example, a much richer message is presented to the user.

The following section describes various examples of the invention. The examples are included to aid in the understanding of the invention but are not intended to limit the scope of the invention.

In one example, a developer uses a client computing device (i.e., a developer client) to launch a builder application. Using the builder application, the developer creates a layout defining an in-message application. In this example, the developer uses a user interface of the builder to drag predefined components onto a grid depicting the visual structure of an in-message application. Each component is represented according to its predefined size (relative to the grid) and the user can edit the components or define attributes of each component by double clicking on the component representation within the grid.

Continuing the example, after placing a set of components, the developer sets attributes of the components. By double-clicking on a survey component, the developer is shown a user interface including a user interface for defining survey options. The developer maps a first survey option to the metadata tag "HomeTeam" and maps a second survey option to the metadata tag "AwayTeam". Returning to the grid view, the developer enters the message "Name your pick for tonight's game!" into a text component of the in-message application. A URL component of the in-message application maps a text sub-component to the HTML title tag and a thumbnail sub-component to the metadata tag "URLthumb".

Continuing the example, the developer creates a web page including the metadata tags "HomeTeam", "AwayTeam", and "URLthumb". The article is a sports article discussing an upcoming basketball game between the Boston Celtics and the Los Angeles Lakers. Thus, the following metadata tags are defined within the HTML web page:
<meta name="twitter:HomeTeam" content="Los Angeles Lakers">
<meta name="twitter:AwayTeam" content="Boston Celtics">
<meta name="twitter:URLthumb" content="http://sports.sample.com/images/2012/12/19/Celtics-Lakers-thumb.jpg">

Furthermore, the title tag is defined as follows: "<title>Celtics and Lakers Clash in LA</title>". Continuing the example, the developer selects an option to preview the in-message application and enters a broadcast message including a URL of the web page into a message composition box. Upon selecting a preview option, the broadcast message is parsed to identify the URL and the web page is read by a preview tool. The preview tool extracts the metadata tag values and assigns them to their corresponding components. Furthermore, the preview tool fetches the thumbnail image from the location specified by the URLthumb tag (i.e., "http://sports.sample.com/images/2012/12/19/Celtics-Lakers-thumb.jpg"). The preview tool then renders the resulting preview by displaying the components and content within a preview dialog, based on the predefined visual structure.

Continuing the example, the developer then selects an option to publish the in-message application using the builder tool. In response the builder sends a platform independent layout file containing markup describing the layout of the in-message application to a messaging platform. The messaging platform registers the published in-message application by assigning a unique identifier to the in-message application and making the application available to one or more authorized users of the messaging platform. In this example, the authorized users/accounts are selected by the developer and included in the publish request.

Continuing the example, a weekly web page for upcoming basketball games is updated to include the required metadata tags of the in-message application. Each week, after the web page is published, an employee of the publication logs into an account of the messaging platform and authors a new broadcast message including a URL of the web page. Upon posting, the broadcast message is fanned out to hundreds of fans, subscribers, and affiliates of the authoring account (based on their graph relationship with the account). The in-message application is rendered by various different client computing devices for display to users of those devices. The rendering is performed according to a platform dependent template (corresponding to each platform) which is cached on the client devices and includes the visual structure of the in-message application.

Figure 5A:
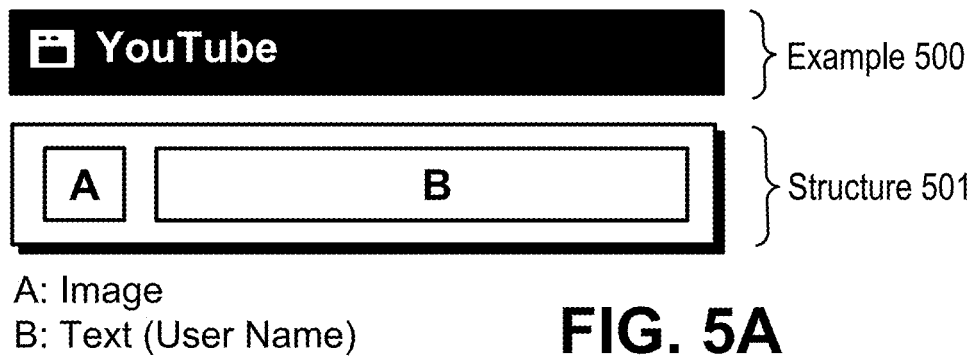

FIGS. 5A-5G depict examples of various different components, in accordance with various embodiments of the invention. Figure 5A depicts an example (500) and structure (501) of an attribution component. This component includes two primitives (an image and a textbox) and has the following required metadata tags: user_id, user_Image, user_name, background_color, and font color. The attribution is intended to attribute the broadcast message to an account of the messaging platform.

Figure 5B:
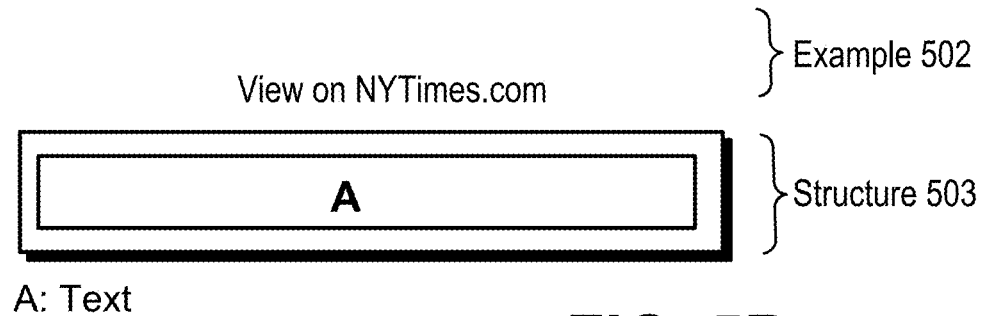

FIG. 5B depicts an example (502) and structure (503) of a footer component. This component includes a single primitive (a text box) and is configured to display a URL in a footer of the broadcast message. The following are required metadata tags: url, text, and color.

Figure 5C:
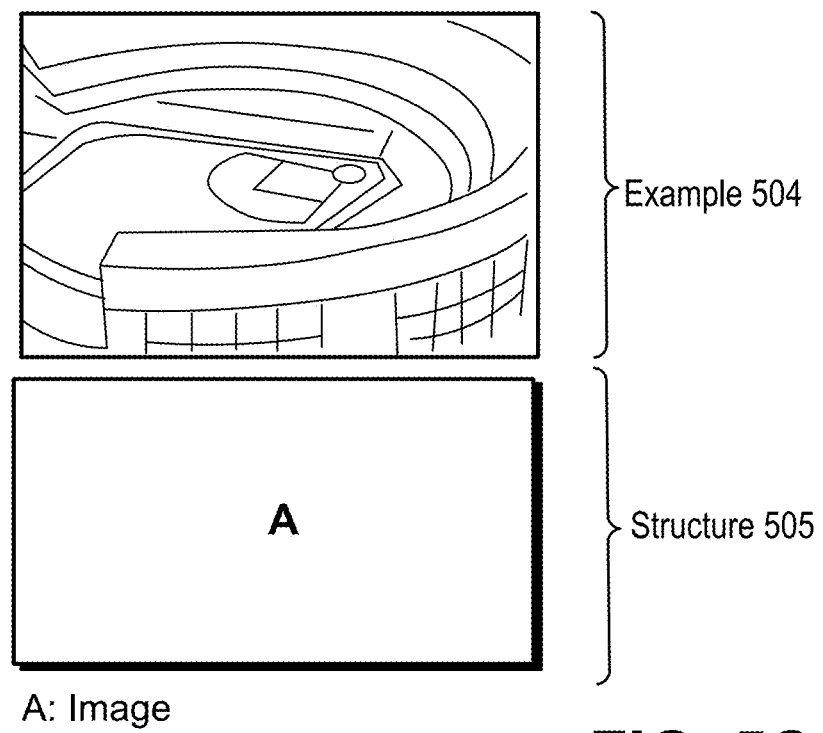

FIG. 5C depicts an example (504) and structure (505) of a large image component. This component includes a single primitive (an image) and is configured to display the image referenced by a provided URL (i.e., via a metadata tag).

Figure 5D:
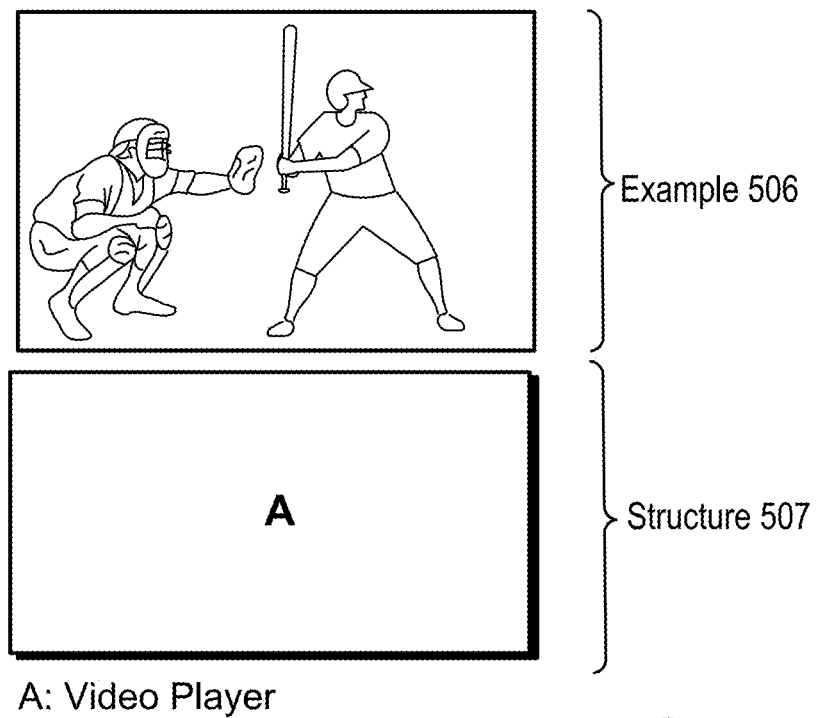

FIG. 5D depicts an example (506) and structure (507) of a large video component. This component includes a single primitive (a video) and is configured to allow video playback within the body of a broadcast message. The required metadata tags are: url, preview_image, stream, stream_content_type, stream_width, stream_height. The "preview_image" tag designates an image thumbnail which will represent the video before playback is initiated, the "stream" and "stream_content_type" tags define a URL and format of the corresponding video, respectively. The "url" tag is a URL to a web page including the video.

Figure 5E:
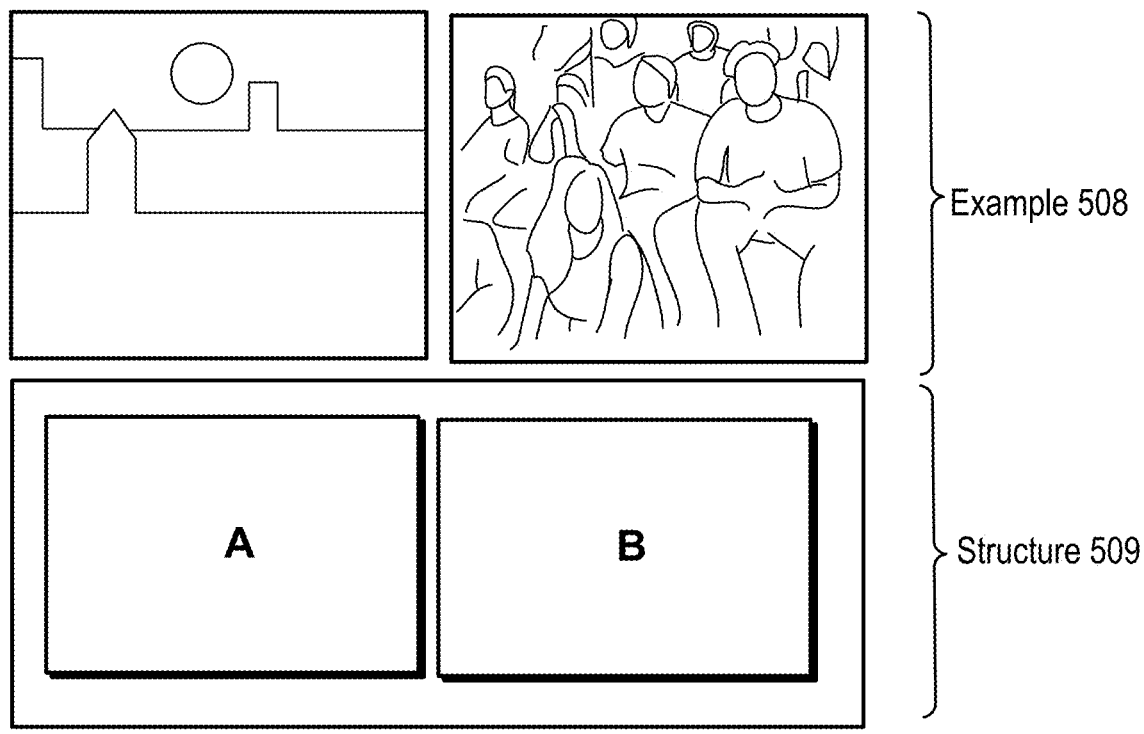

FIG. 5E depicts an example (508) and structure (509) of a double image component. This component includes two primitive images and is configured to display the two images side-by-side within an in-message application. In the depicted example, components of an in-message application can only be stacked vertically by developers in a layout, and thus, the double image component and other horizontally stacked compound components allow developers to utilize the entire area of the visual structure. The double image component includes the following metadata tags: url1, url2, image1 image2.

Figure 5F:
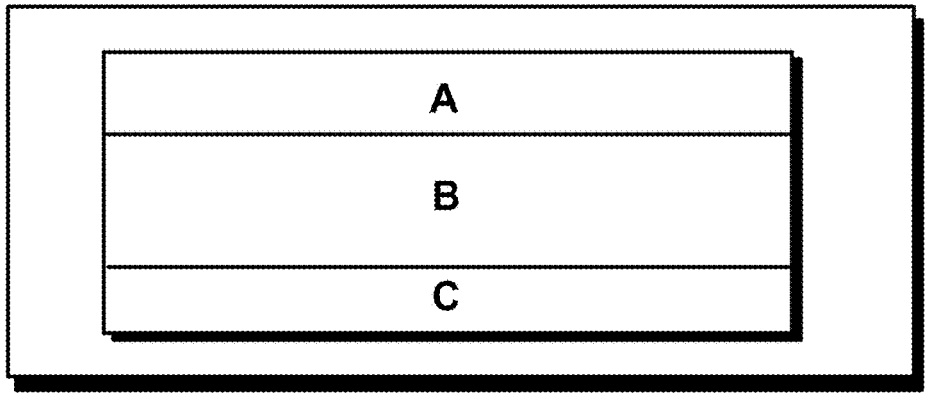

FIG. 5F depicts an example (510) and structure (511) of a title/description/byline component. This component includes three primitives (three textboxes) and is configured to display a title, description, and attribution of an article. The title/description/byline component includes the following metadata tags: url, title, description, creator_user_id (a numerical identifier of an account), creator user name (a unique screenname of the account), creator_user_screen_name (a display name of the account).

FIG. 5G depicts an example (512) and structure (513) of a title/desc/byline/image component. This component includes four textbox primitives (a title textbox, a description textbox, a byline textbox, and a thumbnail image) and is configured to display a title, description, attribution, and thumbnail image of an article. The title/desc/byline/image component includes the following metadata tags: url, title, description, creator_user_id, creator_user_name, creator_user_screen_name, image (a URL of the image).

Figure 6A:
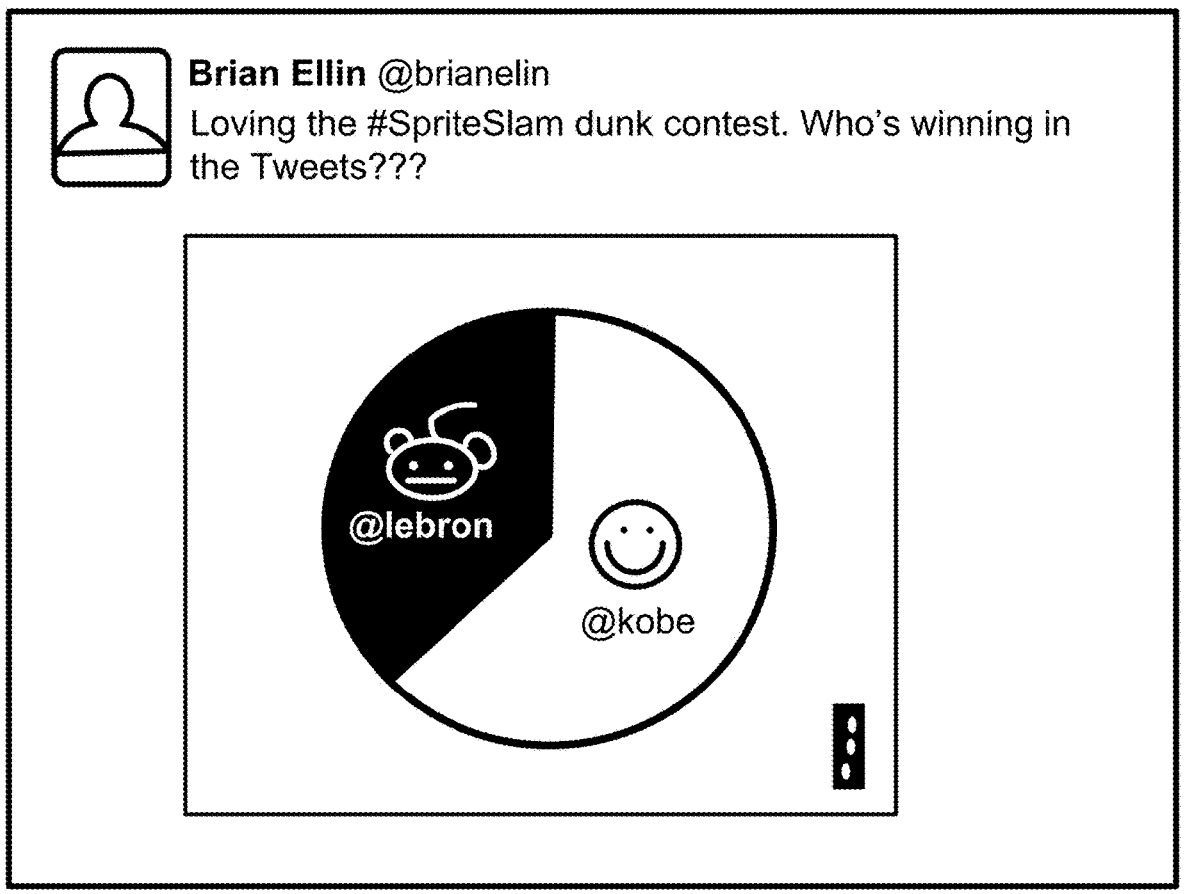

FIGS. 6A-6I show example renderings of in-message applications in accordance with one or more embodiments of the invention. FIG. 6A shows an example rendering of an in-message application which tracks the mentions of two different accounts (@lebron and @kobe) among messages of a messaging platform. The pie-chart component of this in-message application shows the proportion of mentions of each account in a predefined time period.

FIG. 6B shows an example rendering of an in-message application which tracks a user's weight and body fat percentage over time. The in-message application is configured to read the weight and body fat percentage from an external data provider which reads values from an internet connected health device of the user.

Figure 6C:
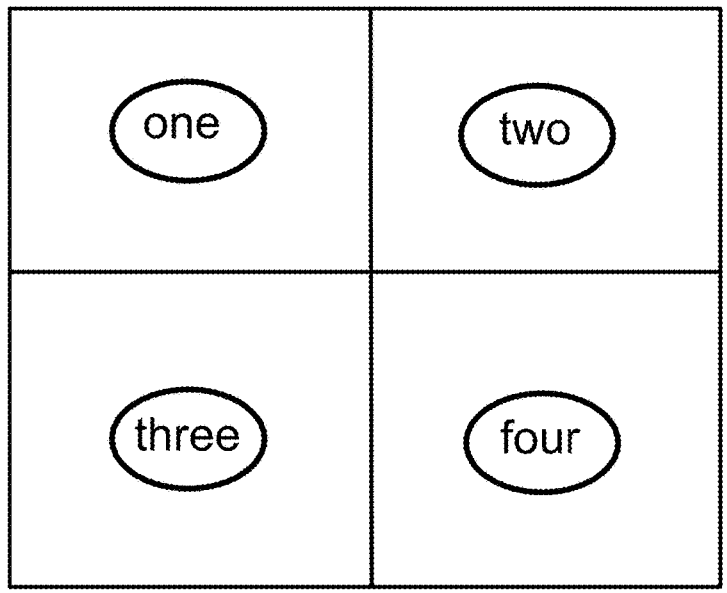

FIG. 6C shows an example rendering of an in-message application which includes a photo grid component.

Figure 6D:
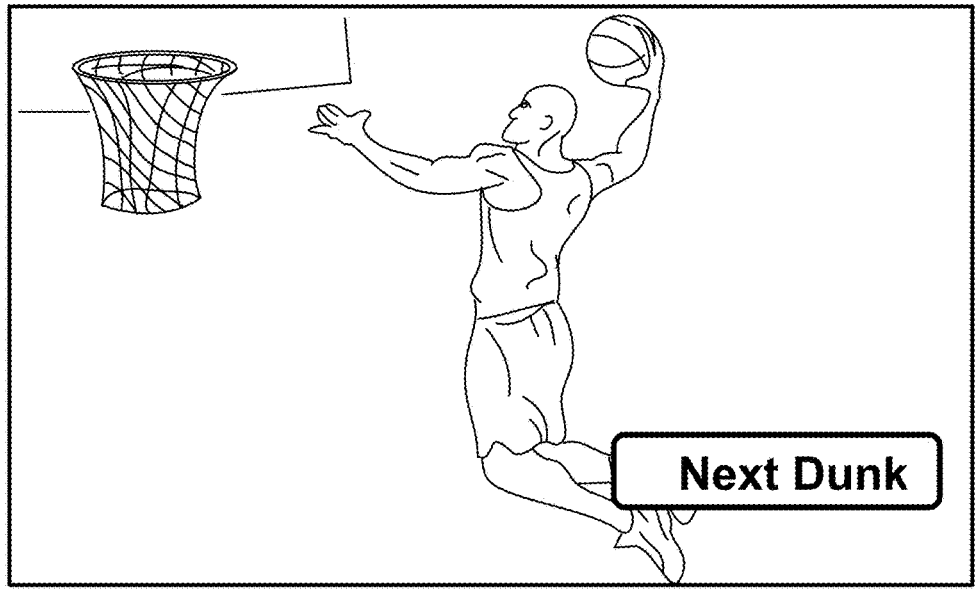

FIG. 6D shows an example rendering of an in-message application which includes a photo slideshow component.

Figure 6E:
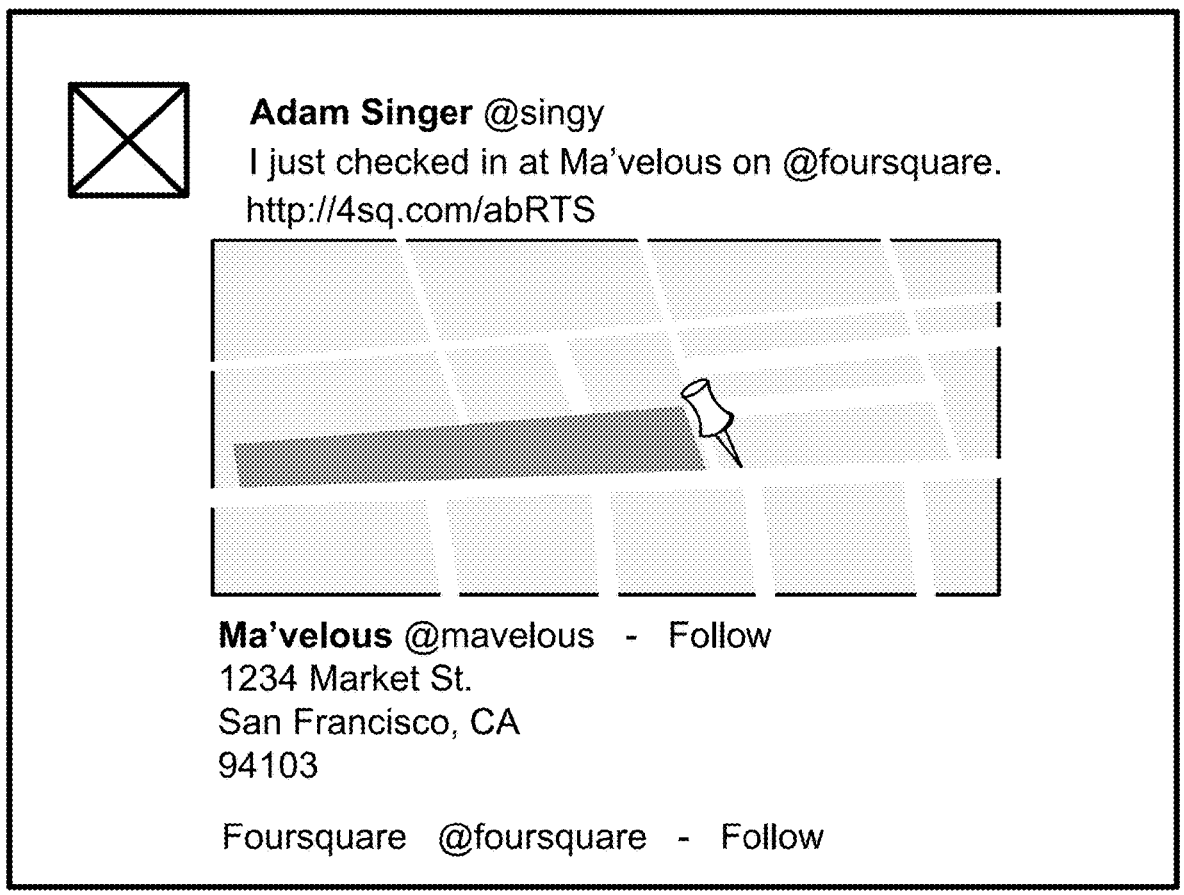
Figure 6F:
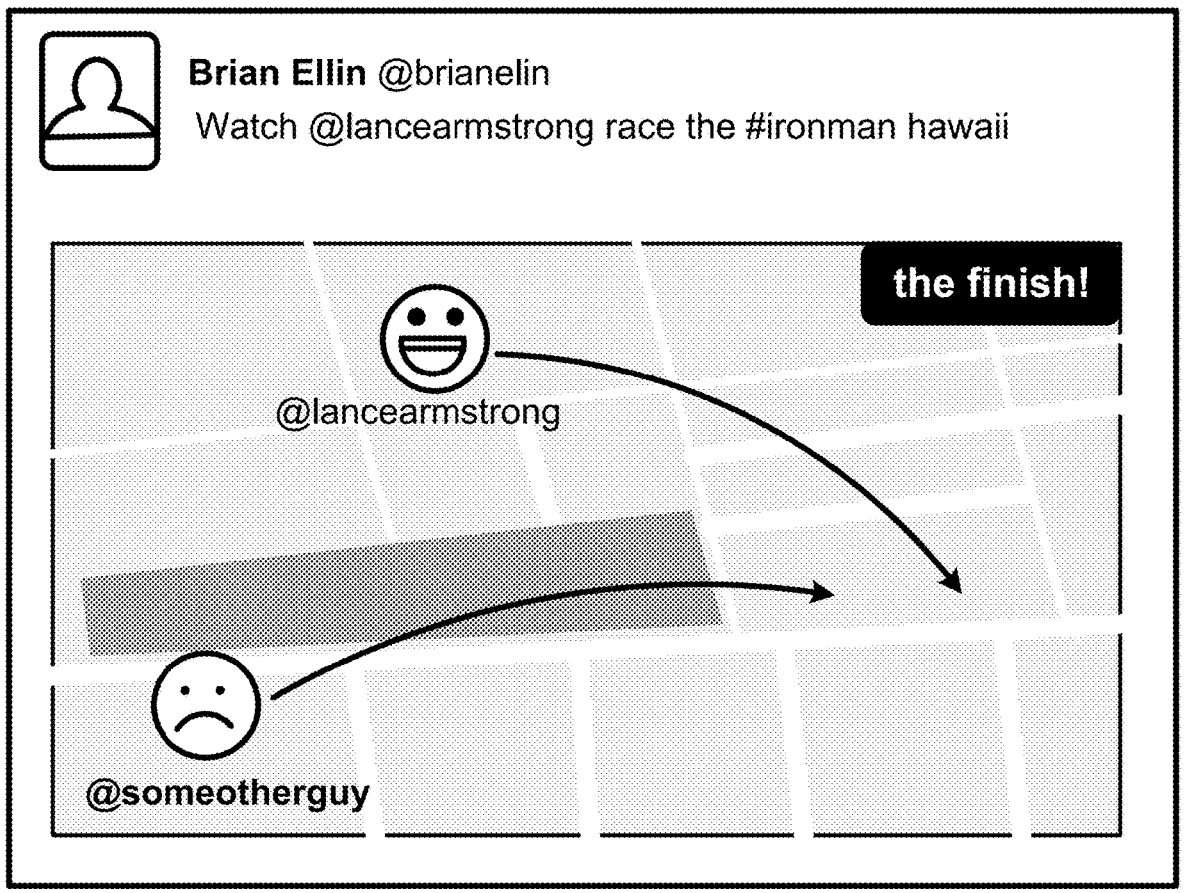

FIG. 6E shows an example rendering of an in-message application which includes a map component. In this example, the messaging platform receives a global positioning system (GPS) coordinate of the user from an external data provider and generates a map depicting a location of the user for display within the map component. FIG. 6F shows an example rendering of an in-message application which includes a map component. In this example, the messaging platform receives multiple global positioning system (GPS) coordinates of different users (in this case, @lancearmstrong and @someotherguy) directly from each user's mobile device. A map is then generated depicting locations of the users for display within the map component.

FIG. 6G shows an example rendering of an in-message application which is configured for audio playback. In this example, the rendering of the in-message application includes options for playing songs from various artists in a playlist of a user of an external music service.

FIG. 6H shows an example rendering of an in-message application which displays an item for sale. The in-message application is configured to fetch content from a listing of the item from an external auction website, and to populate a set of components accordingly (i.e., price, title, description, image). The in-message application also includes a "Buy Now" button which, when selected by a user, performs the action of purchasing the item (e.g., through the external auction website).

Figure 6I:

FIG. 6I shows an example rendering of an in-message application which includes a trigger component. In this example, the trigger is configured to calculate a number of rebroadcasts of the message by other accounts of the messaging platform. Upon detecting that the number of rebroadcasts has reached 1,000,000, the rendering of the in-message application is modified to display a movie trailer.

FIG. 7A shows an example set of in-message application tags which can be used to create application metadata. The application metadata can reside within a HyperText Markup Language (HTML) file and can be created (e.g., by builder 142 of FIG. 1, discussed above) to map content from one or more external data providers to one or more components of an in-message application.

FIG. 7B shows an example of web page metadata (i.e., application metadata) identifying an in-message application. The metadata displayed in FIG. 7B can be stored in an external data provider (e.g., a web server) and can be downloaded by a component of a messaging platform (e.g., application engine 102 of FIG. 1, discussed above) and served to clients for use in rendering of an in-message application.

FIG. 7C shows an example rendering of an in-message application by a web client. The broadcast message in this example is served to the web client with the required content (i.e., article text, image, etc.) which was fetched from an external data provider based on the application metadata defined in FIG. 7B. The web client renders the in-message application according to a visual structure of the in-message application which, in this example, is stored on a server of the messaging platform (e.g., in application repository 130 of FIG. 1, discussed above).

FIG. 7D shows an example rendering of an in-message application by a mobile client. The broadcast message in this example is served to the mobile client with the same required content as the example of FIG. 7C. In this example, the mobile client caches a platform dependent template containing the visual structure in a local storage. The mobile client then receives the broadcast message and renders the in-message application according to the template.

Embodiments of the invention may be implemented on virtually any type of computer regardless of the platform being used. For example, as shown in FIG. 8, a computer system (800) includes one or more processor(s) (802) (such as a central processing unit (CPU), integrated circuit, hardware processor, etc.), associated memory (804) (e.g., RAM, cache memory, flash memory, etc.), a storage device (806) (e.g., a hard disk, an optical drive such as a compact disk drive or digital video disk (DVD) drive, a flash memory stick, etc.), a network adapter (818), and numerous other elements and functionalities typical of today's computers (not shown). One or more components of computer system 800 may be communicatively connected by a bus (816). Computer system 800 may also include input means, such as a keyboard (808), a mouse (810), or a microphone (not shown). Further, computer system 800 may include output means, such as a monitor (812) (e.g., a liquid crystal display (LCD), a plasma display, or cathode ray tube (CRT) monitor). Computer system 800 may be connected to a network (814) (e.g., a local area network (LAN), a wide area network (WAN) such as the Internet, or any other type of network) via network adapter 818. Those skilled in the art will appreciate that many different types of computer systems exist, and the aforementioned input and output means may take other forms. Generally speaking, computer system 800 includes at least the minimal processing, input, and/or output means necessary to practice embodiments of the invention.

Further, in one or more embodiments of the invention, one or more elements of the aforementioned computer system (800) may be located at a remote location and connected to the other elements over a network. Further, embodiments of the invention may be implemented on a distributed system having a plurality of nodes, where each portion of the invention (e.g., application engine 102, frontend module 104, routing module 108, etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a flash memory device, a solid state drive, a primary storage device, or any other tangible computer readable storage device.

One or more embodiments of the invention have one or more of the following advantages. By providing a platform for creating, viewing, and engaging with in-message applications, it may be possible to increase user engagement with messages of a messaging platform. Furthermore, by allowing content providers to use and create in-message applications, it may be possible to increase the quality, relevance, and variety of content shared by the messaging platform.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    requesting, by a client computing device, a message stream from a social messaging platform, the message stream including a plurality of messages including a message having an in-message application, wherein the in-message application has a layout defining a visual structure for presenting message content;
    receiving message stream information for the message stream from the social messaging platform;
    determining whether a template corresponding to the in-message application is stored on the client computing device; and
    in response to determining that the template is not stored on the client computing device:
        before receiving the template from the social messaging platform, rendering the plurality of messages of the message stream, wherein the message including the in-message application is rendered with only a text reference to web content provided by an external content provider,
        requesting the template from the social messaging platform, and
        in response to receiving the template, re-rendering the message including:
            retrieving the web content from the external content provider through the text reference; and
            replacing the text reference with a rendered in-message application by incorporating the retrieved web content based on the visual structure according to the template.

2. The method of claim 1, wherein the text reference comprises a reference to a location of the web content as a uniform resource locator (URL).

3. The method of claim 1, further comprising updating the in-message application to include updated web content from the external content provider.

4. The method of claim 3, wherein the template is platform-specific to the social messaging platform of the client computing device.

5. The method of claim 3, wherein determining that the template is stored on the client computing device comprises searching a browser cache of the client computing device for the template corresponding to the in-message application referenced by the message.

6. The method of claim 3, wherein, the message is a first message, the message stream is a first message stream, and the method further comprising:
    storing, by the client computing device, the received template;
    requesting, by the client computing device, a second message stream from the social messaging platform, the second message stream including a plurality of messages including a second message having the in-message application;
    receiving message stream information from the social messaging platform for the second message stream;
    determining that the template corresponding to the in-message application is stored on the client computing device; and
    in response to determining that the template corresponding to the in-message application is stored on the client computing device, rendering the second message according to the template.

7. A system comprising:
    one or more computers and one or more storage devices storing instructions that are operable, when executed by the one or more computers, to cause the one or more computers to perform operations comprising:
    requesting, by a client computing device, a message stream from a social messaging platform, the message stream including a plurality of messages including a message having an in-message application, wherein the in-message application has a layout defining a visual structure for presenting message content;
    receiving message stream information for the message stream from the social messaging platform;
        determining whether a template corresponding to the in-message application is stored on the client computing device; and
    in response to determining that the template is not stored on the client computing device:
        before receiving the template from the social messaging platform, rendering the plurality of messages of the message stream, wherein the message including the in-message application is rendered with only a text reference to web content provided by an external content provider,
        requesting the template from the social messaging platform, and
        in response to receiving the template, re-rendering the message including:
        retrieving the web content from the external content provider through the text reference; and
        replacing the text reference with a rendered in-message application by incorporating the retrieved web content based on the visual structure according to the template.

8. The system of claim 7, wherein the text reference comprises a reference to a location of the web content as a uniform resource locator (URL).

9. The system of claim 7, wherein the operations further comprise updating the in-message application to include updated web content from the external content provider.

10. The system of claim 7, wherein the template is platform-specific to the social messaging platform of the client computing device.

11. The system of claim 7, wherein determining that the template is stored on the client computing device comprises searching a browser cache of the client computing device for the template corresponding to the in-message application referenced by the message.

12. The system of claim 7, wherein, the message is a first message, the message stream is a first message stream, and wherein the operations further comprise:
    storing, by the client computing device, the received template;
    requesting, by the client computing device, a second message stream from the social messaging platform, the second message stream including a plurality of messages including a second message having the in-message application;
    receiving message stream information from the social messaging platform for the second message stream;

determining that the template corresponding to the in-message application is stored on the client computing device; and in response to determining that the template corresponding to the in-message application is stored on the client computing device, rendering the second message according to the template.

13. One or more non-transitory computer-readable storage media encoded with instructions that, when executed by one or more computers, cause the one or more computers to perform operations comprising:

requesting, by a client computing device, a message stream from a social messaging platform, the message stream including a plurality of messages including a message having an in-message application, wherein the in-message application has a layout defining a visual structure for presenting message content;

receiving message stream information for the message stream from the social messaging platform;

determining whether a template corresponding to the in-message application is stored on the client computing device; and in response to determining that the template is not stored on the client computing device:

before receiving the template from the social messaging platform, rendering the plurality of messages of the message stream, wherein the message including the in-message application is rendered with only a text reference to web content provided by an external content provider, requesting the template from the social messaging platform, and in response to receiving the template, re-rendering the message including:

retrieving the web content from the external content provider through the text reference; and replacing the text reference with a rendered in-message application by incorporating the retrieved web content based on the visual structure according to the template.

14. The computer-readable storage media of claim 13, wherein the text reference comprises a reference to a location of the web content as a uniform resource locator (URL).

15. The computer-readable storage media of claim 13, wherein the operations further comprise updating the in-message application to include updated web content from the external content provider.

16. The computer-readable storage media of claim 13, wherein the template is platform-specific to the social messaging platform of the client computing device.

17. The computer-readable storage media of claim 13, wherein determining that the template is stored on the client computing device comprises searching a browser cache of the client computing device for the template corresponding to the in-message application referenced by the message.

18. The computer-readable storage media of claim 13, wherein, the message is a first message, the message stream is a first message stream, and wherein the operations further comprise:

storing, by the client computing device, the received template;

requesting, by the client computing device, a second message stream from the social messaging platform, the second message stream including a plurality of messages including a second message having the in-message application;

receiving message stream information from the social messaging platform for the second message stream;

determining that the template corresponding to the in-message application is stored on the client computing device; and in response to determining that the template corresponding to the in-message application is stored on the client computing device, rendering the second message according to the template.

\* \* \* \* \*

UNITED STATES PATENT AND TRADEMARK OFFICE
CERTIFICATE OF CORRECTION

PATENT NO. : 11,212,244 B1  
APPLICATION NO. : 16/573871  
DATED : December 28, 2021  
INVENTOR(S) : Morgan et al.

Page 1 of 1

It is certified that error appears in the above-identified patent and that said Letters Patent is hereby corrected as shown below:

In the Claims

Column 23, Line 48, Claim 4, delete "claim 3," and insert -- claim 1, --.

Column 23, Line 51, Claim 5, delete "claim 3," and insert -- claim 1, --.

Column 23, Line 56, Claim 6, delete "claim 3," and insert -- claim 1, --.

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*